(12) United States Patent
Jian et al.

(10) Patent No.: US 11,594,990 B2
(45) Date of Patent: Feb. 28, 2023

(54) CATCH SPIN METHOD FOR PERMANENT MAGNET SYNCHRONOUS MOTOR WITH SENSORLESS FIELD ORIENTED CONTROL

(71) Applicant: Infineon Technologies Austria AG, Villach (AT)

(72) Inventors: Long Fei Jian, Shaanxi (CN); Nagappan Rethinam, Torrance, CA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 17/852,776

(22) Filed: Jun. 29, 2022

(65) Prior Publication Data

US 2022/0337183 A1 Oct. 20, 2022

Related U.S. Application Data

(63) Continuation of application No. 16/735,881, filed on Jan. 7, 2020, now Pat. No. 11,404,983.

(51) Int. Cl.

| H02P 21/10 | (2016.01) |
|---|---|
| H02P 21/22 | (2016.01) |
| H02P 21/34 | (2016.01) |
| H02P 21/00 | (2016.01) |

(Continued)

(52) U.S. Cl.
CPC ............ *H02P 21/10* (2013.01); *H02P 6/21* (2016.02); *H02P 21/0089* (2013.01); *H02P 21/22* (2016.02); *H02P 21/34* (2016.02); *H02P 27/12* (2013.01); *H02P 2205/07* (2013.01)

(58) Field of Classification Search
CPC ...... H02P 21/10; H02P 21/0089; H02P 21/22; H02P 21/34; H02P 27/12; H02P 2205/07; H02P 6/16; H02P 6/182; H02P 6/21; H02P 25/026; H02P 21/00; G05B 2219/34001; G05B 2219/37317; G05B 2219/41401; G05B 2219/42122
See application file for complete search history.

(56) References Cited

U.S. PATENT DOCUMENTS

| 8,242,720 | B2 * | 8/2012 | Daboussi | ............... | H02P 21/34 |
| | | | | | 318/400.15 |
| 9,160,264 | B2 * | 10/2015 | Hu | ........................ | H02P 21/34 |

(Continued)

*Primary Examiner* — Bickey Dhakal
(74) *Attorney, Agent, or Firm* — Harrity & Harrity, LLP

(57) ABSTRACT

A motor control actuator that drives a permanent magnet synchronous motor (PMSM) with sensorless Field Oriented Control includes a sampling circuit that generates a measurement signal by measuring a back electro motive force (BEMF) of the PMSM, while the PMSM rotates; a PLL that receives the measurement signal and extracts an amplitude and an angle of the BEMF from the measurement signal; and a motor controller that generates a first set of two phase alternating current (AC) voltage components based on an estimated rotor angle, generates a second set of two phase AC voltage components based on the amplitude and the angle, and generates control signals for driving the PMSM based on the first set of two phase AC voltage components. The motor controller performs a catch spin sequence for restarting the PMSM while rotating, the catch spin sequence includes a synchronizing period followed by a closed loop control period.

18 Claims, 15 Drawing Sheets

(51) Int. Cl.
*H02P 27/12* (2006.01)
*H02P 6/21* (2016.01)

(56) References Cited

U.S. PATENT DOCUMENTS

| | | | |
|---|---|---|---|
| 2004/0249596 A1* | 12/2004 | Ho | H02P 21/32 |
| | | | 702/106 |
| 2006/0197482 A1* | 9/2006 | Harwood | H02P 6/182 |
| | | | 318/432 |
| 2007/0001635 A1* | 1/2007 | Ho | H02P 21/34 |
| | | | 318/400.11 |
| 2010/0148710 A1* | 6/2010 | Lim | H02P 6/20 |
| | | | 318/400.11 |
| 2016/0276966 A1* | 9/2016 | Tian | H02P 6/20 |
| 2020/0136537 A1* | 4/2020 | Karasawa | H02P 6/17 |
| 2021/0013817 A1* | 1/2021 | Ohashi | H02P 6/22 |

* cited by examiner

CATCH SPIN METHOD FOR PERMANENT MAGNET SYNCHRONOUS MOTOR WITH SENSORLESS FIELD ORIENTED CONTROL

CROSS-REFERENCE TO RELATED APPLICATIONS

This application is a continuation of U.S. patent application Ser. No. 16/735,881 filed Jan. 7, 2020, which are incorporated by reference as if fully set forth.

FIELD

The present disclosure relates generally to devices and to methods for implementing a catch spin method for a permanent magnet synchronous motor (PMSM), and more particularly to a PMSM with sensorless Field Oriented Control (FOC).

BACKGROUND

Motor control algorithms are used by a motor controller for controlling a permanent magnet synchronous motor (PMSM). A PMSM may be used in fan motors, such as those used in vacuum cleaners, exhaust fans, oil smoke extraction fans, or other similar applications.

A power dip ride through occurs in battery operated home appliance electronics such as a vacuum cleaner. An on-off switch is common and installed in the final home appliance goods. The on-off switch engages the equipped battery on-off action resulting in an instantaneous on-off switching of a direct current (DC) bus voltage supplied to a power inverter for a variable speed control.

A technical challenge of a power dip ride through arises for driving a three-phase permanent magnet motor without motor position sensors (e.g., a permanent magnet synchronous motor (PMSM) with sensorless Field Oriented Control (FOC)) for the power inverter controlled home appliance electronics. In particular, when a motor running at a high speed is disconnected from power (e.g., by switching off the on-off switch to the appliance), the motor controller loses its supply power and re-initiates a cold start when the main battery power is re-connected (e.g., by switching on the on-off switch to the appliance) even if the motor is still winding down. In other words, a user may turn the motor back on before the motor has stopped. However, the motor controller initiates a cold start regardless of whether the motor is rotating or not. In this condition, the motor is still rotating at a high speed yet the motor controller does not have sufficient information of motor running condition/status information. The lack of this information causes overcurrent and/or overvoltage due to a lack of synchronization to the running motor.

FIG. 1 shows a timing diagram of a typical power dip ride through action where a "Gatekill" indicates an overcurrent trip and a "CatchSpin" indicates an attempt to synchronizing into the rotating motor when the power is re-engaged by an off-on switch action. As can be gleaned from FIG. 1, a motor is running at the time a stop command (i.e., the off-on switch is switched to the off position) is received. At this point, the motor speed MotorSpeed feedback perceived at the motor controller drops to zero. However, the actual speed of the motor is still decreasing. Gatekill and CatchSpin occur because the motor is re-engaged upon receiving a start command (i.e., the off-on switch is switched to the on position) while the motor is still rotating. More particularly, Gatekill and CatchSpin occur because motor controller initiates a cold start of the motor while the motor is still rotating.

Therefore, an improved device having an improved performance of a catch-spin function in permanent magnet synchronous motors with sensorless FOC may be desirable.

SUMMARY

One or more embodiments provide a motor control actuator configured to drive a permanent magnet synchronous motor (PMSM) with sensorless Field Oriented Control (FOC). The motor control actuator includes: a sampling circuit configured to measure a counter electro motive force (CEMF) or a back electro motive force (BEMF) of the PMSM, while the PMSM rotates, and generate a measurement signal based on the measured CEMF or the measured BEMF; a motor controller including a current controller configured to generate control signals for driving the PMSM, the current controller configured to receive the measurement signal and perform a catch spin sequence for restarting the PMSM while rotating based on the measurement signal; and a multi-phase inverter configured to supply multiple phase voltages to the PMSM based on the control signals. The motor controller is configured to match an output voltage of the multi-phase inverter to the measured CEMF or the measured BEMF during the catch spin sequence.

One or more embodiments provide a catch spin method of starting a permanent magnet synchronous motor (PMSM) with sensorless Field Oriented Control (FOC) while the PMSM rotates. The catch spin method includes measuring, while the PMSM rotates, a counter electro motive force (CEMF) or a back electro motive force (BEMF) of the PMSM; generating a measurement signal based on the measured CEMF or the measured BEMF; generating control signals for driving the PMSM; performing a catch spin sequence for restarting the PMSM while rotating based on the measurement signal; supplying, by a multi-phase inverter, multiple phase voltages to the PMSM based on the control signals; and matching an output voltage of the multi-phase inverter to the measured CEMF or the measured BEMF while performing the catch spin sequence.

One or more embodiments provide a motor control actuator configured to drive a permanent magnet synchronous motor (PMSM) with sensorless Field Oriented Control (FOC). The motor control actuator includes: a sampling circuit configured to measure a counter electro motive force (CEMF) or a back electro motive force (BEMF) of the PMSM, while the PMSM rotates, and generate a measurement signal based on the measured CEMF or the measured BEMF; a phase-locked loop (PLL) configured to receive the measurement signal and extract a frequency and an angle of the measured CEMF or the measured BEMF from the measurement signal; and a motor controller including a current controller configured to generate control signals for driving the PMSM, the current controller configured to perform a catch spin sequence for restarting the PMSM while rotating, the catch spin sequence including an open loop control followed by a closed loop control. The motor controller is configured to calculate an initial rotor angle based on the frequency and the angle. During the open loop control, the motor controller is configured to generate the control signals based on the initial rotor angle. During the closed loop control, the motor controller is configured to measure each phase current of the motor, calculate a second rotor angle based on each measured phase current, and generate the control signals based on the second rotor angle.

One or more embodiments provide a catch spin method of starting a permanent magnet synchronous motor (PMSM) with sensorless Field Oriented Control (FOC) while the PMSM rotates. The method includes measuring, while the PMSM rotates, a counter electro motive force (CEMF) or a back electro motive force (BEMF) of the PMSM; generating a measurement signal based on the measured CEMF or the measured BEMF; extracting a frequency and an angle of the measured CEMF or the measured BEMF from the measurement signal; generating, by a current controller, control signals for driving the PMSM; performing, by the current controller, a catch spin sequence for restarting the PMSM while rotating, the catch spin sequence including an open loop control followed by a closed loop control; and calculating an initial rotor angle based on the frequency and the angle. Performing the catch spin sequence during the open loop control includes generating the control signals based on the initial rotor angle. Performing the catch spin sequence during the closed loop control includes measuring each phase current of the motor, calculating a second rotor angle based on each measured phase current, and generating the control signals based on the second rotor angle.

One or more embodiments provide a motor control actuator configured to drive a permanent magnet synchronous motor (PMSM) with sensorless Field Oriented Control (FOC). The motor control actuator includes: a sampling circuit configured to measure a counter electro motive force (CEMF) or a back electro motive force (BEMF) of the PMSM, while the PMSM rotates, and generate a measurement signal based on the measured CEMF or the measured BEMF; a phase-locked loop (PLL) configured to receive the measurement signal and extract an amplitude and an angle of the measured CEMF or the measured BEMF from the measurement signal; and a motor controller including a current controller configured to generate a first set of two phase alternating current (AC) voltage components based on an estimated rotor angle, generate a second set of two phase AC voltage components based on the amplitude and the angle, generate control signals for driving the PMSM based on the first set of two phase AC voltage components. The current controller is configured to perform a catch spin sequence for restarting the PMSM while rotating, the catch spin sequence including a synchronizing period followed by a closed loop control period. During the synchronizing period, the motor controller is configured to estimate a first rotor angle based on the second set of two phase AC voltage components, wherein the first rotor angle is used by the current controller to synchronize to a rotor angle of the PMSM. During the closed loop control period, the motor controller is configured to estimate a second rotor angle based on the first rotor angle and based on the first set of two phase AC voltage components, wherein the second rotor angle is used by the current controller to synchronize to the rotor angle of the PMSM

BRIEF DESCRIPTION OF THE DRAWINGS

Embodiments are described herein making reference to the appended drawings.

DETAILED DESCRIPTION

Figure 1:
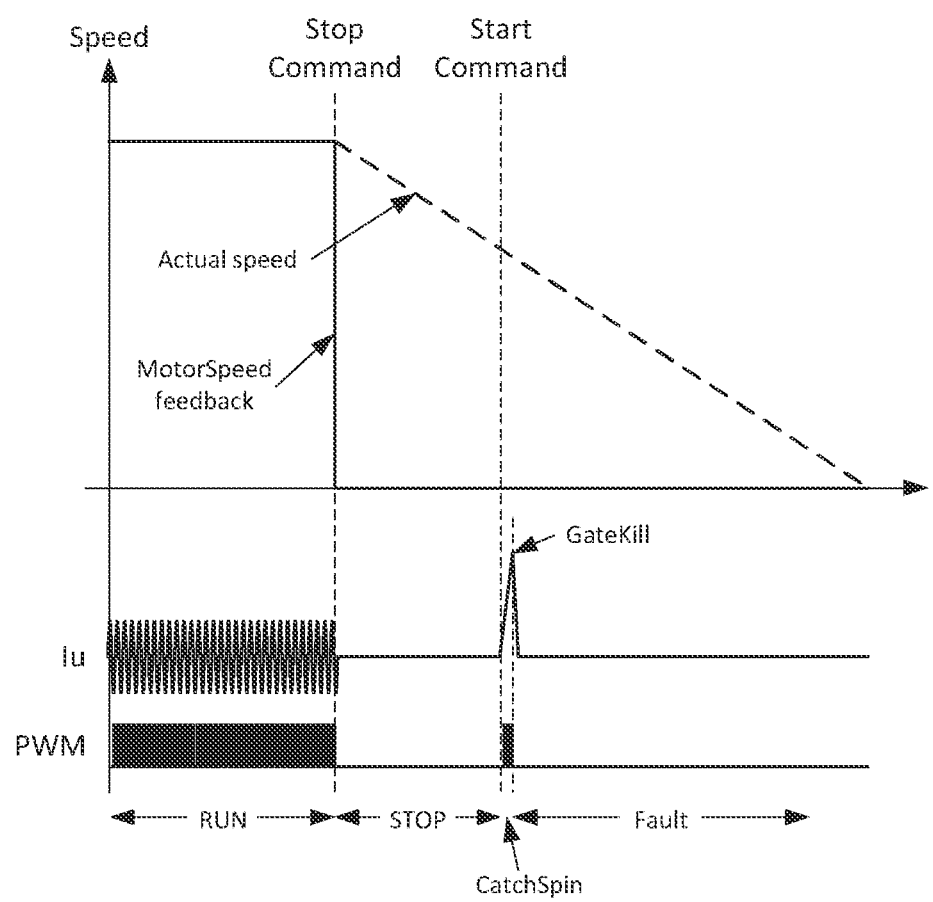
FIG. 1 illustrates a timing diagram of a typical power dip ride through of a conventional motor controller.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "above", "front", "behind", "back", "leading", "trailing", etc., may be used with reference to the orientation of the figures being described. Because parts of embodiments can be positioned in a number of different orientations, the directional terminology is used for purposes of illustration and is in no way limiting. It is to be understood that other embodiments may be utilized and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The term "substantially" may be used herein to account for small manufacturing tolerances (e.g., within 5%) that are deemed acceptable in the industry without departing from the aspects of the embodiments described herein.

A sensor may refer to a component which converts a physical quantity to be measured to an electric signal, for example, a current signal or a voltage signal. The physical quantity may, for example, be a current or a voltage at a shunt resistor in a single-shunt resistor system.

A signal processing circuit and/or a signal conditioning circuit may receive one or more signals from one or more components and perform signal conditioning or processing thereon. Signal conditioning, as used herein, refers to manipulating a signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Thus, a signal processing circuit may include an analog-to-digital converter (ADC) that converts the analog signal from the one or more sensor elements to a digital signal. The signal processing circuit may also include a digital signal processor (DSP) that performs some processing on the digital signal.

Many functions of modern devices in automotive, consumer and industrial applications, such as converting electrical energy and driving an electric motor or an electric machine, rely on power semiconductor devices. For example, Insulated Gate Bipolar Transistors (IGBTs), Metal Oxide Semiconductor Field Effect Transistors (MOSFETs) and diodes, to name a few, have been used for various applications including, but not limited to switches in power supplies and power converters.

A power semiconductor device usually comprises a semiconductor structure configured to conduct a load current along a load current path between two load terminal structures of the device. Further, the load current path may be controlled by means of a control electrode, sometimes referred to as gate electrode. For example, upon receiving a corresponding control signal from, e.g., a driver unit, the control electrode may set the power semiconductor device in one of a conducting state and a blocking state. A control signal may by a voltage signal or a current signal having a controlled value.

A power transistor is a power semiconductor device that may be used to drive a load current. For example, an IGBT is turned "ON" or "OFF" by activating and deactivating its gate terminal. Applying a positive input voltage signal across the gate and the emitter will keep the device in its "ON" state, while making the input gate signal zero or slightly negative will cause it to turn "OFF". There is a turn-on process and a turn-off process for switching the power transistor on and off. During the turn-on process, a gate driver integrated circuit (IC) may be used to provide (source) a gate current (i.e., an on current) to the gate of the power transistor in order to charge the gate to a sufficient voltage to turn on the device. In contrast, during the turn-off process, the gate driver IC is used to draw (sink) a gate current (i.e., an off current) from the gate of the power transistor in order to discharge the gate sufficiently to turn off the device. A current pulse may be output from the gate driver IC as the control signal according to a pulse width modulation (PWM) scheme. Thus, the control signal may be switched between an ON current level and an OFF current level during a PWM cycle for controlling a power transistor. This in turn charges and discharges the gate voltage to turn on and off the power transistor, respectively.

In particular, the gate of a power transistor is a capacitive load, and the turn ON current (i.e., gate source current) and the turn OFF current (i.e., gate sink current) are specified as the initial current when a switching event is initiated. During a turn OFF event, after some small amount of time (small compared to the PWM period), the gate current decreases and reaches a zero value when the gate reaches 0V. During a turn ON event, after some small amount of time (small compared to the PWM period), the gate current decreases and reaches a zero value when the gate reaches 15V.

Transistors may include Insulated Gate Bipolar Transistors (IGBTs) and Metal Oxide Semiconductor Field Effect Transistors (MOSFETs) (e.g., Si MOSFETs or SiC MOSFETs). While IGBTs may be used as an example in the embodiments below, it will be appreciated that MOSFETs may be substituted for the IGBTs and vice versa. In this context, when substituting a MOSFET for an IGBT, a MOSFET's drain may be substituted for an IGBT's collector, the MOSFET's source may be substituted for the IGBT's emitter, and the MOSFETs drain-source voltage $V_{DS}$ may be substituted for the IGBT's collector-emitter voltage $V_{CE}$ in any one of the examples described herein. Thus, any IGBT module may be substituted by a MOSFET module and vice versa.

Specific embodiments described in this specification pertain to, without being limited thereto, a power semiconductor device that may be used within a power converter or a power supply. Thus, in an embodiment, the power semiconductor device may be configured to carry a load current that is to be supplied to a load and/or, respectively, that is provided by a power source. For example, the semiconductor device may comprise one or more power semiconductor cells, such as a monolithically integrated diode cell, and/or a monolithically integrated transistor cell. Such diode cell and/or such transistor cells may be integrated in a power semiconductor module.

Power semiconductor devices that include transistors which are suitably connected to form half-bridges are commonly used in the field of power electronics. For example, half-bridges may be used for driving electric motors or switched mode power supplies.

For example, a multi-phase inverter is configured to provide multi-phase power by supplying multiple phase loads (e.g., a three-phase motor). For instance, three-phase power involves three symmetrical sine waves that are 120 electrical degrees out of phase with one another. In a symmetric three-phase power supply system, three conductors each carry an alternating current (AC) of the same frequency and voltage amplitude relative to a common reference but with a phase difference of one third the period. Due to the phase difference, the voltage on any conductor reaches its peak at one third of a cycle after one of the other conductors and one third of a cycle before the remaining conductor. This phase delay gives constant power transfer to a balanced linear load. It also makes it possible to produce a rotating magnetic field in an electric motor.

In a three-phase system feeding a balanced and linear load, the sum of the instantaneous currents of the three conductors is zero. In other words, the current in each conductor is equal in magnitude to the sum of the currents in the other two, but with the opposite sign. The return path for the current in any phase conductor is the other two phase conductors. The instantaneous currents result in a current space vector.

A three-phase inverter includes three inverter legs, one for each of the three phases, and each inverter leg is connected to a direct current (DC) voltage source in parallel to each other. Each inverter leg includes a pair of transistors, for example, arranged in a half-bridge configuration for converting DC to AC. In other words, each inverter leg includes two complementary transistors (i.e., a high-side transistor and a low-side transistor) connected in series and which switch on and off complementary to the each other for driving a phase load. However, multi-phase inverters are not limited to three phases, and may include two phases or more than three phases, with an inverter leg for each phase.

Figure 2A:
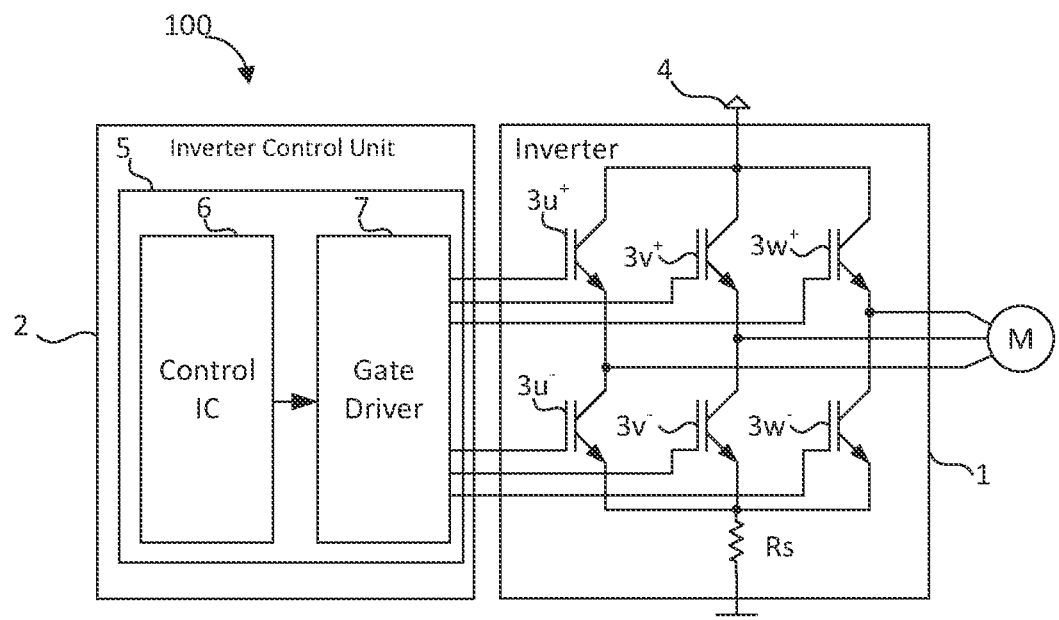
FIG. 2A is a schematic block diagram illustrating a motor control actuator of a power semiconductor device according to one or more embodiments.

FIG. 2A is a schematic block diagram illustrating a motor control actuator 100 of a power semiconductor device according to one or more embodiments. In particular, the motor control actuator 100 includes a power inverter 1 and an inverter control unit 2. The inverter control unit 2 behaves as a motor control unit and thus may also be referred to as a motor controller or a motor control IC. The motor control unit may be a monolithic IC or may be split into a microcontroller and a gate driver on two or more ICs.

The motor control actuator 100 is further coupled to a three-phase motor M, that includes three phases U, V, and W. The power inverter 1 is a three-phase voltage generator configured to provide three-phase power by supplying three phase voltages to drive the motor M. It will be further appreciated that the power inverter 1 and the inverter control unit 2 may be placed on a same circuit board, or on separate circuit boards.

Deviations in both magnitude and phase may cause a loss in power and torque in the motor M. Therefore, the motor control actuator 100 may be configured to monitor and control the magnitude and phase of the voltages supplied to the motor M in real-time to ensure the proper current balance is maintained based on a feedback control loop. Open loop motor control units also exist and may be implemented.

The power inverter 1 for a three-phase motor M includes a switching array of six transistor modules 3u+, 3u−, 3v+, 3v−, 3w+, and 3w− (collectively referred to as transistor modules 3) arranged in complementary pairs. Each complementary pair constitutes one inverter leg that supplies a phase voltage to the three-phase motor M. Thus, each inverter leg includes an upper (high-side) transistor module 3 and a lower (low-side) transistor module 3. Each transistor module may include one power transistor and may also include a diode (not illustrated). Thus, each inverter leg includes an upper transistor and a lower transistor. Load current paths U, V, and W extend from an output of each inverter leg (i.e., the output of each half-bridge) located between complementary transistors and are configured to be coupled to a load, such as motor M. The power inverter 1 is coupled to a DC power supply 4 (e.g., a battery or a diode bridge rectifier) and to the inverter control unit 2.

In this example, the inverter control unit 2 includes a motor control circuit and the gate driver circuit for controlling the switching array. In some examples, the inverter control unit 2 may be monolithic in which the motor control circuit and gate driver circuit are integrated onto a single die. In other examples, the motor control circuit and gate driver circuit may be partitioned as separate ICs. A "monolithic" gate driver is a gate driver on a single silicon chip and may be further made with specific high voltage (HV) technology. Furthermore, the gate driver IC may be integrated on the power inverter 1.

The motor controller performs the motor control function of the motor control actuator 100 in real-time and transmits PWM control signals to a gate driver. Motor control function can include either controlling a permanent magnet motor or an induction motor and can be configured as a sensorless control not requiring the rotor position sensing, as is the case with a sensor based control with Hall sensors and/or an encoder device. Alternatively, the motor control function may include a combination of both sensor based control (e.g., used at lower rotor speeds) and sensorless control (e.g., used at higher rotor speeds).

For example, the inverter control unit 2 includes a controller and driver unit 5 that includes a microcontroller unit (MCU) 6 as the motor controller and a gate driver 7 for generating driver signals for controlling the transistors of each transistor module 3. Thus, load current paths U, V, and W may be controlled by the controller and driver unit 5 by means of controlling the control electrodes (i.e., gate electrodes) of the transistors 3. For example, upon receiving a PWM control signal from the microcontroller, the gate driver IC may set a corresponding transistor in one of a conducting state (i.e., on-state) or a blocking state (i.e., off-state).

The gate driver IC may be configured to receive instructions, including the power transistor control signals, from the microcontroller, and turn on or turn off respective transistors 3 in accordance with the received instructions and control signals. For example, during the turn-on process of a respective transistor 3, the gate driver IC may be used to provide (source) a gate current to the gate of the respective transistor 3 in order to charge the gate. In contrast, during the turn-off process, the gate driver IC may be used to draw (sink) a gate current from the gate of the transistor 3 in order to discharge the gate.

The inverter control unit 2 or the controller and driver unit 5 itself may include a PWM controller, an ADC, a DSP, and/or a clock source (i.e., a timer or counter) used in implementing a PWM scheme for controlling the states of each transistor, and, ultimately, each phase current provided on the respective load current paths U, V, and W.

In particular, the microcontroller 6 of the controller and driver unit 5 may use a motor control algorithm, such as a Field Oriented Control (FOC) algorithm, for providing current control in real-time for each phase current output to a multi-phase load, such a multi-phase motor. Thus, the field-oriented control loop may be referred to as a current control loop. Motor speed may further be controlled by adding a speed constant control loop on top of FOC control that provides speed constant control. Thus, FOC (i.e., the current control loop) may be considered as an inner control loop and a speed constant control loop may be considered as an outer control loop. In addition, motor power, and consequently motor speed, may be further controlled by a power constant control loop on top of the speed constant control loop. Thus, the power constant control loop may be considered the outermost control loop, at least with respect to the current control loop and the speed constant control loop. In other words, the current control loop may be considered as an inner control loop, a speed constant control loop may be considered as an intermediate control loop, and a power constant control loop may be considered as an outer control loop.

The current control loop and the speed constant control loop always remain activated or enabled during motor control (i.e., during runtime of the motor). Likewise, it is possible that the power constant control loop remains activated or enabled during motor control. However, it is also possible that the power constant control loop be switchably activated/deactivated (enabled/disabled) during motor control. In instances when the power constant control loop is activated, the controller and driver unit 5 is considered to be in power constant control mode, even though the speed constant control loop is also activated. In instances when the power constant control loop is deactivated, the controller and driver unit 5 is considered to be in speed constant control mode.

In some cases, motor position may be controlled using a fourth control loop (e.g., a position control loop) that is also outside of the speed constant control loop.

For example, during FOC, a motor phase current should be measured such that an exact rotor position can be determined in real-time. To implement the determination of the motor phase current, the microcontroller 6 may employ an algorithm (e.g., space vector modulation (SVM), also referred as space vector pulse width modulation (SVPWM)) that uses single-shunt current sensing.

Furthermore, the switches 3 (i.e., transistors) of the power inverter 1 are controlled so that at no time are both switches in the same inverter leg turned on or else the DC supply would be shorted. This requirement may be met by the complementary operation of the switches 3 within an inverter leg according to the motor control algorithm.

Figure 2B:
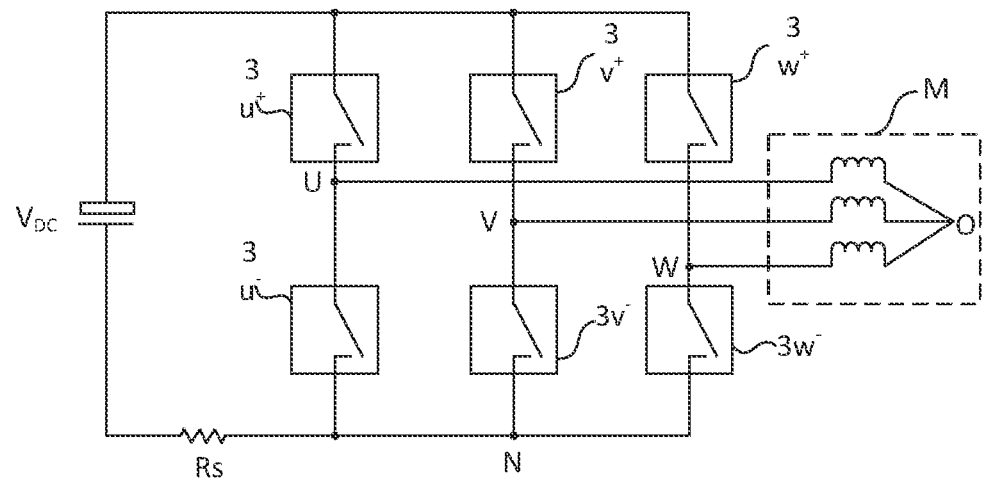
FIG. 2B is a schematic diagram illustrating a power inverter utilizing single-shunt current sensing according to one or more embodiments.

FIG. 2B is a schematic diagram illustrating a power inverter 1 utilizing single-shunt current sensing according to one or more embodiments. In particular, the power inverter 1 includes a shunt resistor Rs placed on the negative DC link of the power inverter 1. The transistors $3_{u+}$, $3_{u-}$, $3_{v+}$, $3_{v-}$, $3_{w+}$, and $3_{w-}$ are represented as switches and the motor M is shown with a winding for each of its phases. Here, UO represents the line to neutral voltage from bridge middle point U to motor neutral point O; UN represents the U bridge voltage from bridge middle point U to the negative bus supply rail N; UV represents the line-to-line voltage from U phase to V phase; VW represents the line-to-line voltage from V phase to W phase; and WV represents the line-to-line voltage from W phase to V phase.

The microcontroller 6 in FIG. 2A may receive samples of the current taken from the shunt resistor Rs and then use an algorithm (i.e., software) to re-construct the three-phase current in real-time. For example, SVPWM is a vector control based algorithm that requires the sensing of the three motor phase currents. By using the single-shunt resistor Rs, DC-link current pulses are sampled at exactly timed intervals. A voltage drop on the shunt resistor Rs may be amplified by an operational amplifier inside inverter control unit 2 and shifted up, for example, by 1.65V. The resultant voltage may be converted by an ADC inside inverter control unit 2. Based on the actual combination of switches, the three-phase currents of the motor M are reconstructed using the SVPWM algorithm. The ADC may measure the DC-link current during the active vectors of the PWM cycle. In each sector, two phase current measurements are available. The calculation of the third phase current value is possible because the three winding currents sum to zero.

SVPWM itself is an algorithm for the control of PWM in real-time. It is used for the creation of AC waveforms, and may be used to drive three-phase AC powered motors at varying speeds from a DC source using multiple switching transistors. While the examples herein are described in the context of three-phase motors, the examples are not limited thereto and may be applied to any load scheme.

In addition, it will be appreciated that other implementations other than a single-shunt resistor may be used for current sensing, as well as other motor control algorithms may be used to control the load, and that the embodiments described herein are not limited thereto.

Figure 3A:
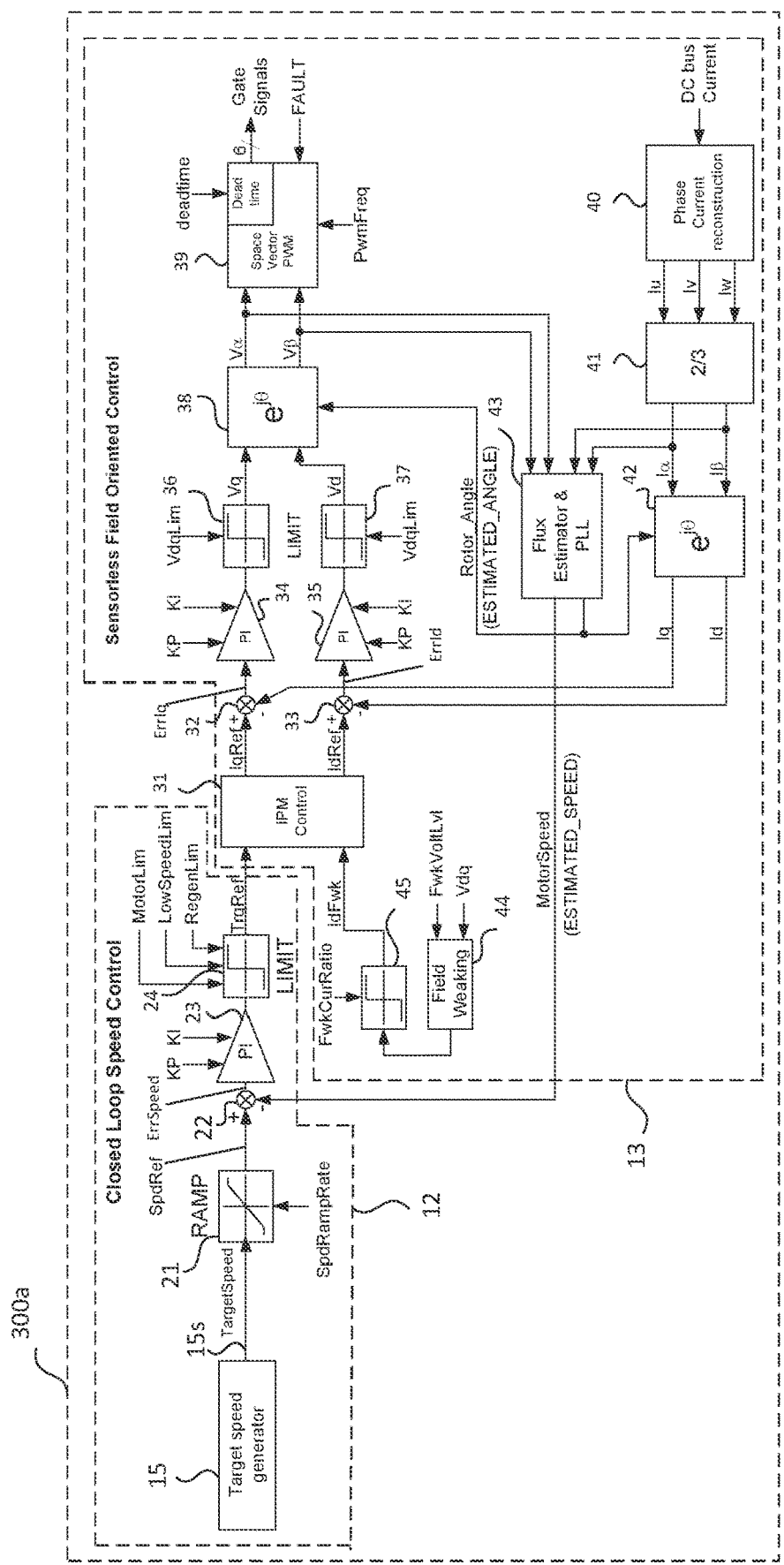
FIG. 3A is a schematic block diagram of a motor control algorithm implemented by a motor controller according to one or more embodiments.

FIG. 3A is a schematic block diagram of a motor control algorithm 300a according to one or more embodiments. The motor control algorithm 300a may be implemented as firmware programmed into motor controller 6 or by a combination of firmware and circuit components. The motor controller 6 itself may include one or more controllers and/or one or more signal processors.

In particular, the motor control algorithm 300a includes a speed constant control loop 12 (i.e., sensorless FOC) and a current control loop 13 that are implemented by motor controller 6 shown in FIG. 2A. Thus, the motor controller 6 includes a speed controller that implement outer loop control and a current controller that implements inner loop control. The speed constant control loop 12 may be used interchangeably with the speed controller 12. Similarly, the current control loop 13 may be used interchangeably with the current controller 13.

As used herein, Vq and Vd represent the stator Q and D axis voltages of the motor in a DQ coordinate system, respectively. That is, Vq is the motor voltage component on the Q-axis of a DQ coordinate system and Vd is the motor voltage component on the D-axis of the DQ coordinate system. Similarly, Iq and Id represent the stator Q and D axis currents of the motor in a DQ coordinate system, respectively. That is, Iq is the motor current component on the Q-axis of the DQ coordinate system and Id is the motor current component on the D-axis of the DQ coordinate system. Furthermore, each Proportional-Integral (PI) controller receives a proportional gain KP and an integral gain KI.

$$\text{PI output}=KP\Delta+KI\int\Delta dt, \qquad \text{Eq. 1,}$$

where $\Delta$ is the error or deviation of an actual measured value (PV) from a setpoint (SP).

$$\Delta=SP-PV \qquad \text{Eq. 2.}$$

Sensorless FOC software supports to drive both types of Permanent Magnet Synchronous Motors (PMSM), i.e., constant air-gap surface mount magnet motor and interior mount magnet motors with variable-reluctance. A sensorless FOC algorithm structure is illustrated in FIG. 3A and follows a cascaded control structure, with an outer speed constant control loop and an inner current control loop that each play a role at varying the motor windings voltages to drive the motor at a target power or a target speed. The speed constant control loop receives a target speed TargetSpeed from, for example, an external signal generator 15 (e.g., (Universal Asynchronous Receiver/Transmitter (UART), variable-speed pump (VSP), Frequency, and Duty Cycle)). For example, the external signal generator 15 may be configured to generate the external digital or analog signal 15s based on one or more input parameters directed to setting a target speed of the motor, and provide the target speed TargetSpeed of the motor to a speed ramp rate SpdRampRate block 21 of the speed controller 12. It will be appreciated that the target speed TargetSpeed may be provided by another source, such as another controller loop that serves as a further outer control loop, thereby making the speed control loop an intermediate control loop.

The speed controller 12 calculates the motor torque required to follow the target speed (TargetSpeed). TargetSpeed is a variable that sets the target speed of the motor. The target speed is a constant value when it is set; it will be changed to a sloped raising value SpdRef by speed ramp rate SpdRampRate block 21 according to a speed ramp rate. The error generator 22 receives the SpdRef signal and an actual (measured) motor speed value MotorSpeed (i.e., estimated speed) from a flux estimator and phase-locked loop (PLL) unit 43, and generates a speed error ErrSpeed that is the deviation between the SpdRef signal and the actual (estimated) motor speed.

The PI compensator 23 acts on the error ErrSpeed. The integral term forces the speed steady state error to zero while the proportional term improves the high frequency response. The PI compensator gains KP and KI are adjusted depending on the motor and load characteristics to meet the target dynamic performance. The output of PI compensator 23 is torque current TrqRef that can sustain the motor speed SpdRef. The limiting function block 24 applies one or more limiting functions on the output of PI compensator 23. For example, the limiting function block 24 performs a motor limiting function MotorLim on the output of the PI compensator 23 to prevent integral windup and to maintain the motor currents within the motor max current. The limiting function block 24 performs a low speed limiting function LowSpeedLim on the output of the PI compensator 23 to limit the motor current at low speed. The limiting function block 24 performs a regeneration current limiting function RegenLim on the output of the PI compensator 23 to limit the regeneration current of the motor.

While the current loops of current controller 13 drive the motor currents needed to generate this torque current TrqRef. The interior permanent magnet (IPM) controller 31 is configured to separate the torque current TrqRef into IdRef and IqRef for interior mount magnet motors with variable-reluctance based on the difference of Ld and Lq. For constant air-gap surface mount magnet (SMM) motor the IqRef equals to TrqRef and IdRef equals to 0. IqRef is a current command (i.e., a reference current value) on the Q-axis. In other words, IqRef is a value of a target current for an Iq current component. Similarly, IdRef is a value of a target current (i.e., a reference current value) for an Id current component. The IPM controller 31 also receives field weakening current IdFwk which is limited by limiting function block 45 based on FwkCurRatio. The flux weakening current IdFwk is calculated by Field Weakening block 44 based on the Vdq (that is the square root of Vd and Vq) and FwkVoltLvl which set the field weakening level. The field weakening current IdFwk will be added to IdRef in IPM controller 31 for all Interior Permanent Magnet Synchronous Motors (IPMSMs) and Surface Permanent Magnet Synchronous Motors (SPMSMs).

The current Iq loop PI compensator 34, also referred to as an Iq controller 34, acts on the error ErrIq between the IqRef and Iq. The integral term forces the steady state error to zero while the proportional term improves the high frequency response. The PI compensator gains KP and KI are adjusted depending on the motor and load characteristics to meet the target dynamic performance. The limiting function block 36 applies one or more limiting functions on the output of the PI compensator 34 to prevent integral windup and to maintain inverter output voltage based on VdqLim.

Similarly, the current Id loop PI compensator 35, also referred to as an Id controller 35, acts on error ErrId between the IdRef and Id. The PI compensator gains KP and KI are also adjusted depending on the motor and load characteristics to meet the target dynamic performance, but generally they are the same as current Iq loop PI compensator 34. The limiting function block 37 applies one or more limiting functions on the output of the PI compensator 35 to prevent integral windup and to maintain inverter output voltage based on VdqLim.

A forward vector rotation unit 38 applies a forward vector rotation to the current loop output voltages Vd and Vq and transforms the current loop output voltages Vd and Vq into two phase AC voltage components Vα and Vβ based on the rotor angle calculated by the flux estimator and PLL unit 43. A space vector pulse width modulator 39 receives the two phase AC voltage components Vα and Vβ and generates the inverter switching signals (i.e., six paths of PWM control signals output from motor controller 6) based on the Vα and Vβ voltage inputs and SVPWM. The gate driver 7 then turns on/off the respective power transistors 3 based on the PWM control signals. PwmFreq provides the frequency of the PWM control signals to the space vector pulse width modulator 39. FAULT provides a fault signal to the space vector pulse width modulator 39 in case of a detected fault.

The current loops of current controller 13 calculate the inverter voltages to drive the motor currents needed to generate the desired torque. The phase current reconstruction circuit 40 uses single shunt reconstruction to reconstruct the each of the phase currents Iu, Iv, and Iw for each respective phase U, V, and W. In particular, phase current reconstruction circuit 40 measures the DC link current in the shunt resistor during the active vectors of the PWM cycle. In each PWM cycle, there are two different active vectors and the DC link current in each active vector represents current on one motor phase. The calculation of the third phase current value is possible because at balanced condition the sum of all the three winding currents is zero.

The Field-oriented control (FOC) uses the Clarke transform at Clarke transformation unit 41 to apply an alpha-beta transformation on the three-phase currents to derive an alpha current Iα and a beta current Iβ. The FOC further uses a vector rotation (i.e., a cordic rotation) at vector rotation unit 42 to transform the motor winding currents using alpha and beta currents Iα and Iβ into two quasi DC current components, an Id current component that reinforces or weakens the rotor field and an Iq current component that generates motor torque.

Two error generators (e.g., subtractors) 32 and 33 generate error values ErrIq and ErrId, respectively. In particular, error generator 32 receives the reference current value IqRef as a setpoint (SP) value from the IPM control block 31 and the Iq current value from the vector rotation unit 42 as the actual measured value (PV), and generates error value ErrIq. Similarly, error generator 33 receives a reference current value IdRef (i.e., the reference current value on the D-axis) from the IPM control block 31, as a setpoint (SP) value and the Id current value from the vector rotation unit 42 as the actual measured value (PV), and generates error value ErrId.

Typically, the torque reference current TrqRef from the speed controller is separated to Iqref and Idref according to the difference of motor inductance Ld, Lq by IPM Control block 31. Iqref and Idref represent target currents. Normally, IdRef is zero for a SMM motor or a negative value scaling to torque current TrqRef for an IPM motor. However, above a certain speed, known as the base speed, the inverter output voltage becomes limited by the DC bus voltage. In this situation, the field weakening controller 44 generates a negative Id plus the Id separated from the torque reference current to oppose the rotor magnet field that reduces the winding back electromotive force (EMF). This enables operation at higher speeds but at a lower torque output. The Field Weakening block 44 is to adjust the Id current to maintain the motor voltage magnitude within the bus voltage limit.

A rotor magnet position estimator includes a flux estimator and PLL 43. The flux estimator and the flux PLL are running in order to detect the rotor position and measure the motor speed of a running motor. Flux is calculated based on feedback current (i.e., using alpha and beta currents $I\alpha$ and $I\beta$), estimated voltages $V\alpha$ and $V\beta$ (based on DC bus feedback voltage and a modulation index), and motor parameters (inductance and resistance). The output of the flux estimator represents rotor magnet fluxes in Alpha-Beta (stationary orthogonal frame, u-phase aligned with Alpha) two-phase quantities.

The angle and frequency phase-locked loop (PLL) of the flux estimator and PLL 43 estimates the flux angle (i.e., estimated rotor angle) and motor speed from the rotor magnet flux vector in Alpha-Beta components. A vector rotation of the PLL calculates the error between the rotor flux angle and the estimated angle. API compensator and integrator of the PLL in the closed loop path force angle and frequency estimate to track the angle and frequency of the rotor flux. The motor speed is derived from the rotor frequency according to the number of rotor poles.

When driving an interior permanent magnet (IPM) motor the rotor saliency can generate a reluctance torque component to augment the torque produced by the rotor magnet. When driving a surface magnet motor (SMM), there is zero saliency (Ld=Lq) and Id is set to zero for maximum efficiency. In the case of IPM motor which has saliency (Ld<Lq) a negative Id will produce positive reluctance torque. The most efficient operating point is when the total torque is maximized for a given current magnitude. The most efficient operating point of both surface magnet motors (SMM) and interior permanent magnet (IPM) motors is calculated by IPM Control block 31.

It will be appreciated that the speed constant controller 12 and the current controller 13 as shown merely illustrated one example configuration and are not limited thereto. For example, in general, the speed constant controller 12 is configured with a speed control loop that outputs the torque current TrqRef based on target speed TargetSpeed. In addition, the current controller 13 is configured to calculate voltage and current information used for driving the motor based on the torque current TrqRef output from the speed constant controller 12. In particular, the current controller 13 determines the stator Q-axis and D-axis voltages Vd and Vq, as well as the stator Q-axis and D-axis currents Iq and Id.

In a conventional catch spin method, the controller tracks the back EMF in order to determine if the motor is turning, and if so, in which direction. The conventional catch spin sequence begins after the bootstrap capacitor charging stage is completed. During conventional catch spin, both IqRef and IdRef are set to 0 (Speed regulator is disabled), meanwhile the flux PLL attempts to lock to the actual motor speed (MotorSpeed) and rotor angle (RotorAngle). A catch spin time is defined by a TCatchSpin parameter. Once the catch spin time is elapsed, the calculated motor speed is checked with a "DirectStartThr" parameter value. If the motor speed is more than or equal to the "DirectStartThr" parameter value, normal speed control starts, current motor speed will become the initial speed reference and is also set as the speed ramp starting point. Depending on the set target speed, the motor will decelerate (via regenerative braking) or accelerate to reach the desired speed. If the motor speed is less than the "DirectStartThr" parameter value, the motor state changes to an "ANGLESENSING" state.

During a forward catch spin sequence where the motor is spinning in the same direction as desired, no motor current is injected. After the catch spin time TCatchSpin has elapsed, assuming the flux PLL of block 43 locks to the actual motor speed, the motor speed at that instance becomes the initial speed reference and the starting point for the speed ramp reference SpdRef used by the speed ramp rate SpdRampRate block 21. The motor continues to accelerate or decelerate, following the speed ramp reference SpdRef to reach the set target speed TargetSpeed.

During a reverse catch spin sequence where the motor is spinning in the opposite direction as desired, no motor current is injected. After the TCatchSpin time has elapsed, the motor is still spinning in an opposite direction at a speed higher than a Regen Speed Threshold (RegenSpdThr). Thus, an injected torque, limited by the value defined in the RegenLim parameter, forces the motor to decelerate via regenerative braking. Once the speed of the reverse spinning motor falls below the Regen Speed Threshold (RegenSpdThr), the injected torque is limited by MotorLim (RegenLim<MotorLim). The injected torque forces the motor to come to a stop and start accelerating in the desired spin direction, following the speed ramp reference SpdRef to reach the set target speed TargetSpeed.

The described embodiments seek to improve the performance of the catch-spin function in permanent magnet synchronous motor sensorless FOC control. To accomplish this, the motor controller 6 is configured to identify the real time based motor Counter Electro Motive Force (CEMF) or Back Electro Motive Force (BEMF) of the running motor prior to re-initiating the closed loop current control (i.e., prior to re-engaging the current control loop 13).

Figure 3B:
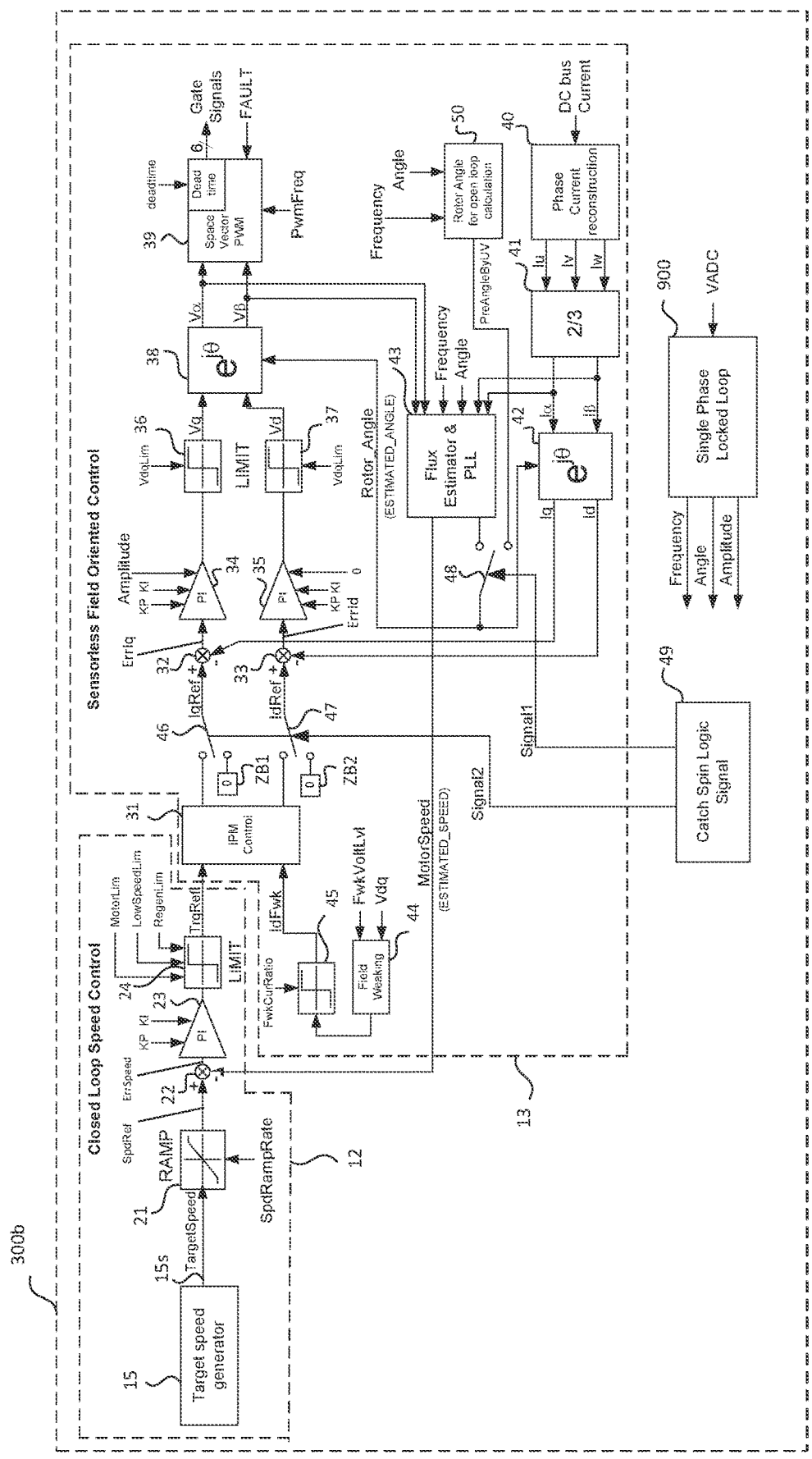
FIG. 3B is a schematic block diagram of a motor control algorithm with a catch spin method implemented by a motor controller according to one or more embodiments.

FIG. 3B is a schematic block diagram of a motor control algorithm 300b with a catch spin method implemented by a motor controller according to one or more embodiments. The motor control algorithm 300b includes blocks 46, 47, 48, 49, 50, and 900 that are added to the motor control algorithm 300a. The details of these additional blocks will be described below. The function of all other blocks in FIG. 3B are the same as the blocks in FIG. 3A.

The motor control algorithm 300b includes a single phase-locked loop (PLL) 900 that obtains a voltage signal $V_{ADC}$ of a line-to-line voltage UV from a CEMF sampling circuit and calculates the frequency, angle, and amplitude of the line-to-line voltage UV.

A catch spin controller 49 is configured to generate logic signals in the catch spin process. When entering into a catch spin process (corresponding to stage ① in FIG. 10), the catch spin controller 49 starts a catch spin timer to monitor a catch spin time. Additionally, at stage ① the frequency and the angle calculated by the PLL 900 are used to initialize the flux estimator and PLL 43 and an open loop rotor angle calculation unit 50. As can be seen, both blocks 43 and 50 receive the frequency and the angle information from the PLL 900.

Figure 10:
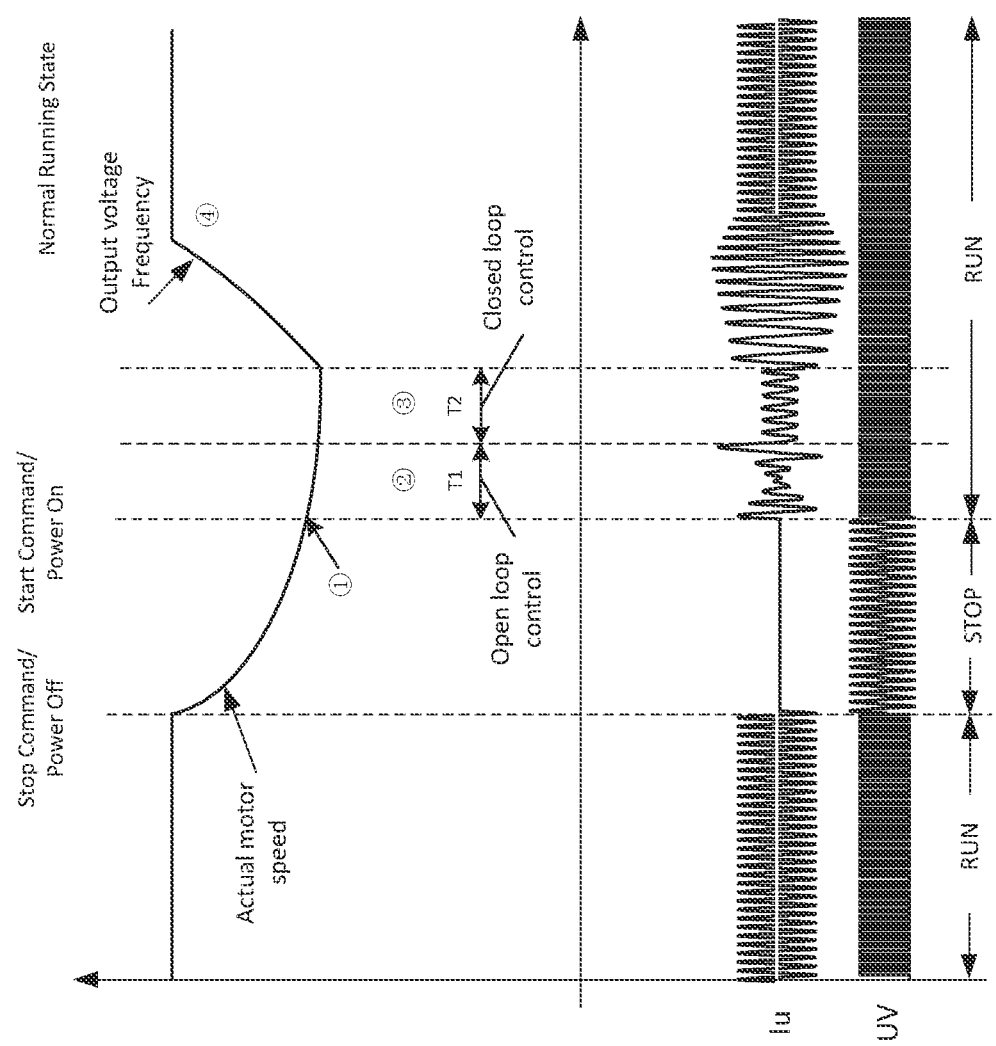
FIG. 10 is a timing diagram of one catch spin method sequence according to one or more embodiments.

Initializing the flux estimator and PLL 43 with the frequency and the angle enables the flux estimator and PLL 43 to output the correct rotor angle in stage ③ in FIG. 10. Initializing the open loop rotor angle calculation unit 50 with the frequency and the angle enables the open loop rotor angle calculation unit 50 to calculate a pre-angle PreAngleByUV which is used in stage ② in FIG. 10 for open loop control in catch spin mode. The pre-angle PreAngleByUV is an initial angle that is used to accumulate an initial frequency to be used when entering into the catch spin process.

In addition, when entering into the catch spin process, the current Iq loop PI compensator 34 is initialized by an amplitude signal generated by the PLL 900, and the current Id loop PI compensator 35 is initialized by 0. This initializing of the current Iq loop PI compensator 34 and current Id loop PI compensator 35 is to make the first inverter output voltage match the CEMF or the BEMF. At the point of entering into catch spin, the catch spin controller 49 generates and outputs signal 1 to control switch 48 to couple to the open loop rotor angle calculation unit 50. By doing so, the forward vector rotation unit 38 is coupled to the open loop rotor angle calculation unit 50 to receive the pre-angle PreAngleByUV for open loop control in stage ② in FIG. 10.

When entering into the catch spin process, the catch spin controller 49 also generates and outputs signal 2 to control switches 46 and 47. In particular, the catch spin controller 49 controls switches 46 and 47 to connect to zero blocks ZB1 and ZB2 such that error generators 32 and 33 are respectively coupled thereto. By doing so, IqRef and IdRef are made equal to 0, thereby effectively disabling speed control via speed control loop 12 for the catch spin process and ensuring that only current control via current control loop 13 is used in the catch spin process.

Figure 13:
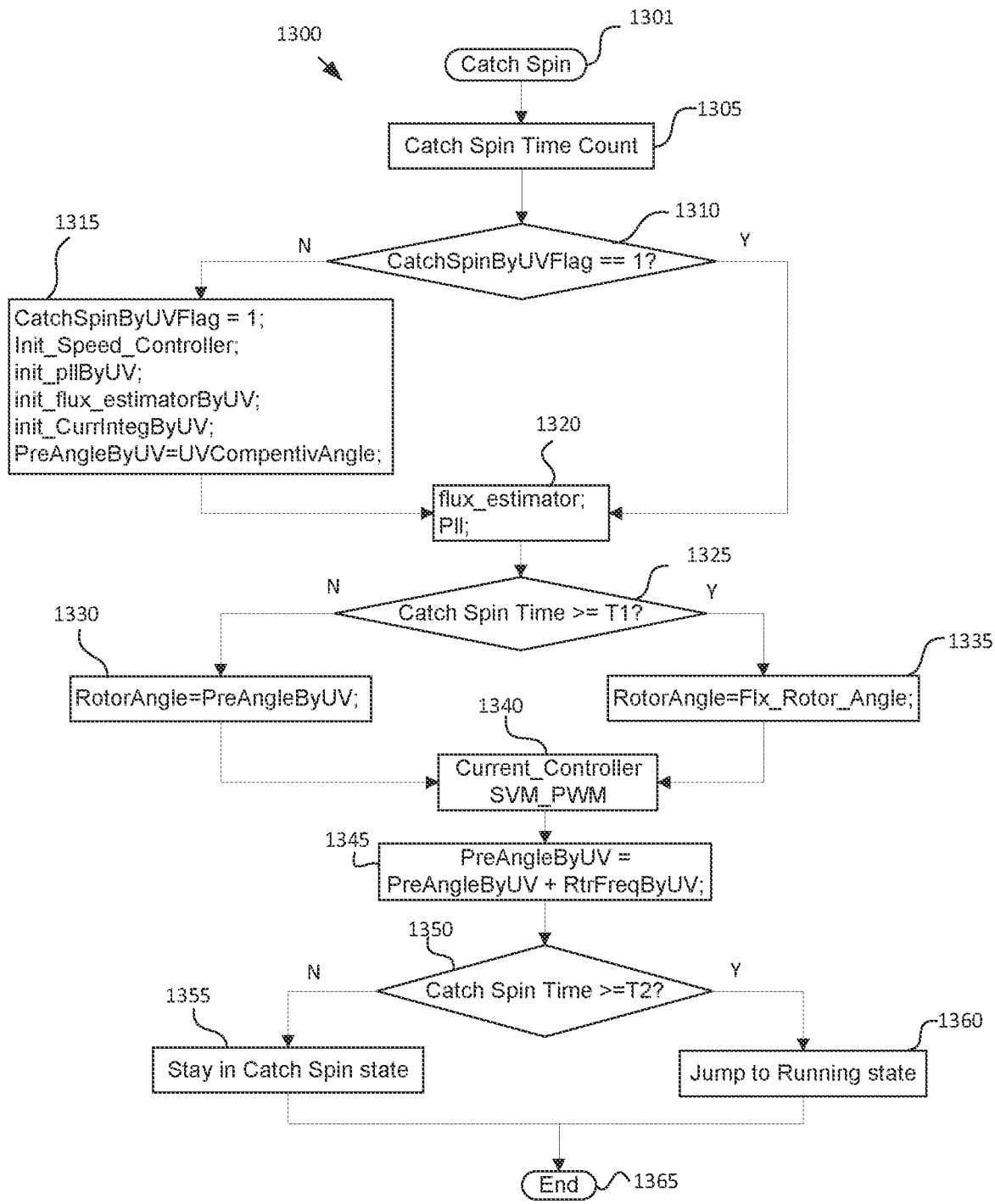
FIG. 13 is a flow diagram of a catch spin operation of the motor start operation illustrated in FIG. 12 according to one or more embodiments.

When the open loop control (i.e., stage ② in FIG. 10) is completed, which corresponds to the catch spin time being equal to or greater than time interval T1 shown in FIG. 10 and further indicated in operation 1325 in FIG. 13 (operation 1325) (i.e., time interval T1 has expired), the catch spin controller 49 generates and outputs signal 1 to change the position of switch 48 such that switch 48 is coupled to the flux estimator and PLL 43, thereby initiating closed loop control.

When the closed loop control (i.e., stage ③ in FIG. 10) is completed at the expiration of time interval T2 shown in FIG. 10 and further indicated in operations 1350 and 1360 in FIG. 13, the catch spin controller 49 controls switches 46 and 47 to connect to the IPM Control block 31 in order to restore the normal running state, including re-enabling the speed control loop 12.

Figure 3C:
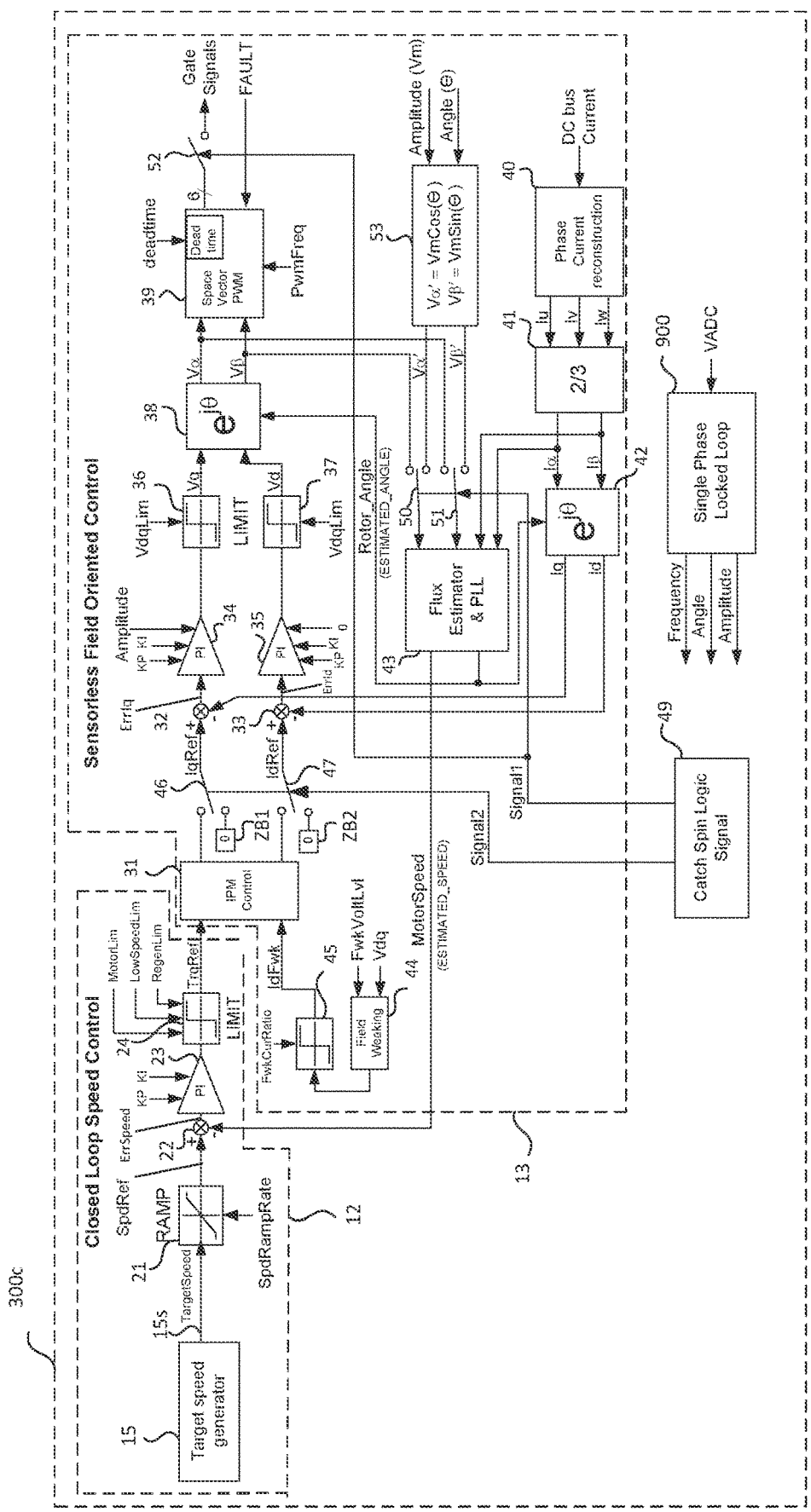
FIG. 3C is a schematic block diagram of a motor control algorithm with another catch spin method implemented by a motor controller according to one or more embodiments.

FIG. 3C is a schematic block diagram of a motor control algorithm 300c with another catch spin method implemented by the motor controller according to one or more embodiments. The motor control algorithm 300c includes block 46, block 47, block 49, block 50, block 51, block 52, block 53 and block 900 that are added to the motor control algorithm 300a. The details of these additional blocks will be described below. The function of all other blocks in FIG. 3C are the same as the blocks in FIG. 3A.

The motor control algorithm 300c includes a single phase-locked loop (PLL) 900 that obtains a voltage signal $V_{ADC}$ of a line-to-line voltage UV from a CEMF sampling circuit and calculates the frequency, angle, and amplitude of the line-to-line voltage UV.

A voltage component processing block 53 receives the amplitude and the angle output from PLL 900 and calculates two phase AC voltage components Vα' and Vβ' based on the amplitude and angle output from PLL 900.

The catch spin controller 49 is configured to generate logic signals for implementing the catch spin process. When entering into a catch spin process (corresponding to stage ① in FIG. 11), the catch spin controller 49 starts a catch spin timer to monitor a catch spin time and the voltage component processing block 53 calculates Vα' and Vβ' based on the amplitude and angle output from the PLL 900. In addition, when entering into the catch spin process, the catch spin controller 49 generates and outputs signal 1 to control the states of switches 50, 51, and 52. In particular, switch 52 is opened to disable the PWM outputs of the space vector pulse width modulator 39. Additionally, switches 50 and 51 are controlled to be coupled to voltage components Vα' and Vβ' output from voltage component processing block 53, respectively.

When entering into the catch spin process, the catch spin controller 49 also generates and outputs signal 2 to control switches 46 and 47. In particular, the catch spin controller 49 controls switches 46 and 47 to connect to zero blocks ZB1 and ZB2 such that error generators 32 and 33 are respectively coupled thereto. By doing so, IqRef and IdRef are made equal to 0, thereby effectively disabling speed control via speed control loop 12 for the catch spin process and ensuring that only current control via current control loop 13 is used in the catch spin process.

Figure 11:
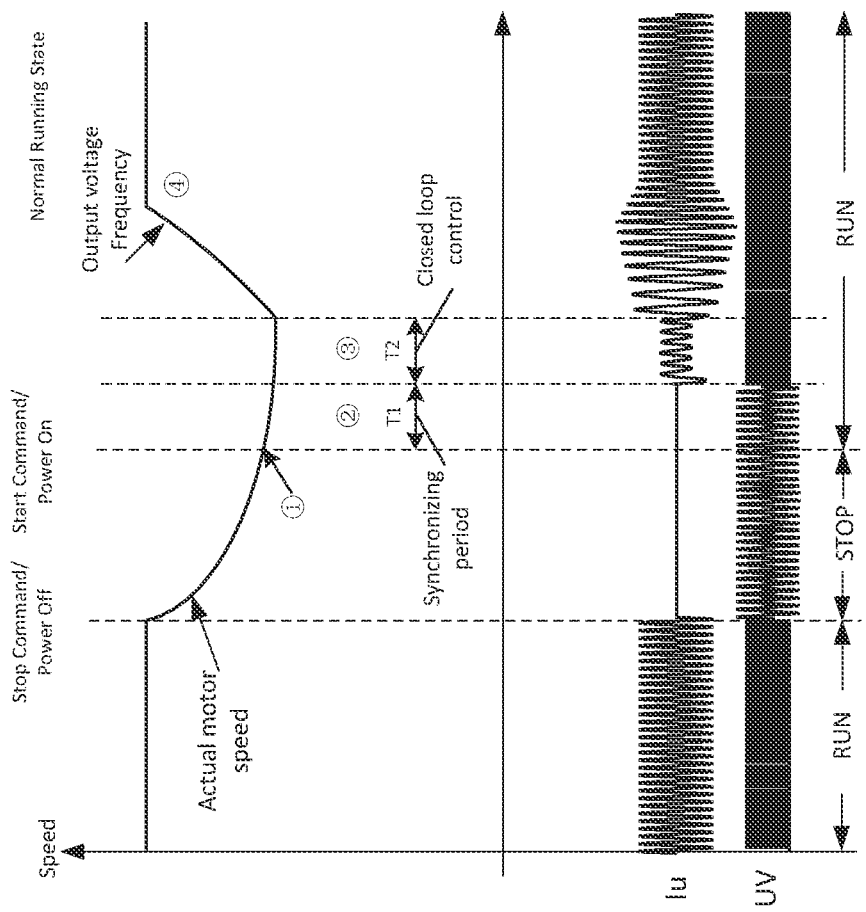
FIG. 11 is a timing diagram of another catch spin method sequence according to one or more embodiments.

In stage ② in FIG. 11 (i.e., a synchronizing period defined by time interval T1), all blocks statuses are maintained as initialized in stage ① in FIG. 11. As a result, alpha and beta currents Iα and Iβ are also zero because there is no PWM output from the space vector pulse width modulator 39.

At the expiration of time interval T1 defined by the catch spin time, the synchronizing period (i.e., stage ② in FIG. 11) is completed. This can be described as the catch spin time being equal to or greater than catch spin time T1 in operation 1410 in FIG. 14. At the expiration of time interval T1, time interval T2 corresponding to closed loop control begins. To enable the closed loop control, the catch spin controller 49 generates and outputs signal 1 to change the switching states of switches 50, 51, and 52 into their alternate switching positions. In particular, switches 50 and 51 connect the outputs of the forward vector rotation unit 38 (i.e., Vα and Vβ) to the flux estimator and PLL 43 and closes switch 52 to re-enable the PWM outputs of the space vector pulse width modulator 39, to achieve closed loop control. In particular, when the closed loop control begins, the current Iq loop PI compensator 34 is initialized by the amplitude signal VO generated by the PLL 900, and the current Id loop PI compensator 35 is initialized by 0. This initializing of the current Iq loop PI compensator 34 and current Id loop PI compensator 35 is to make the first inverter output voltage match the CEMF of BEMF.

Figure 14:
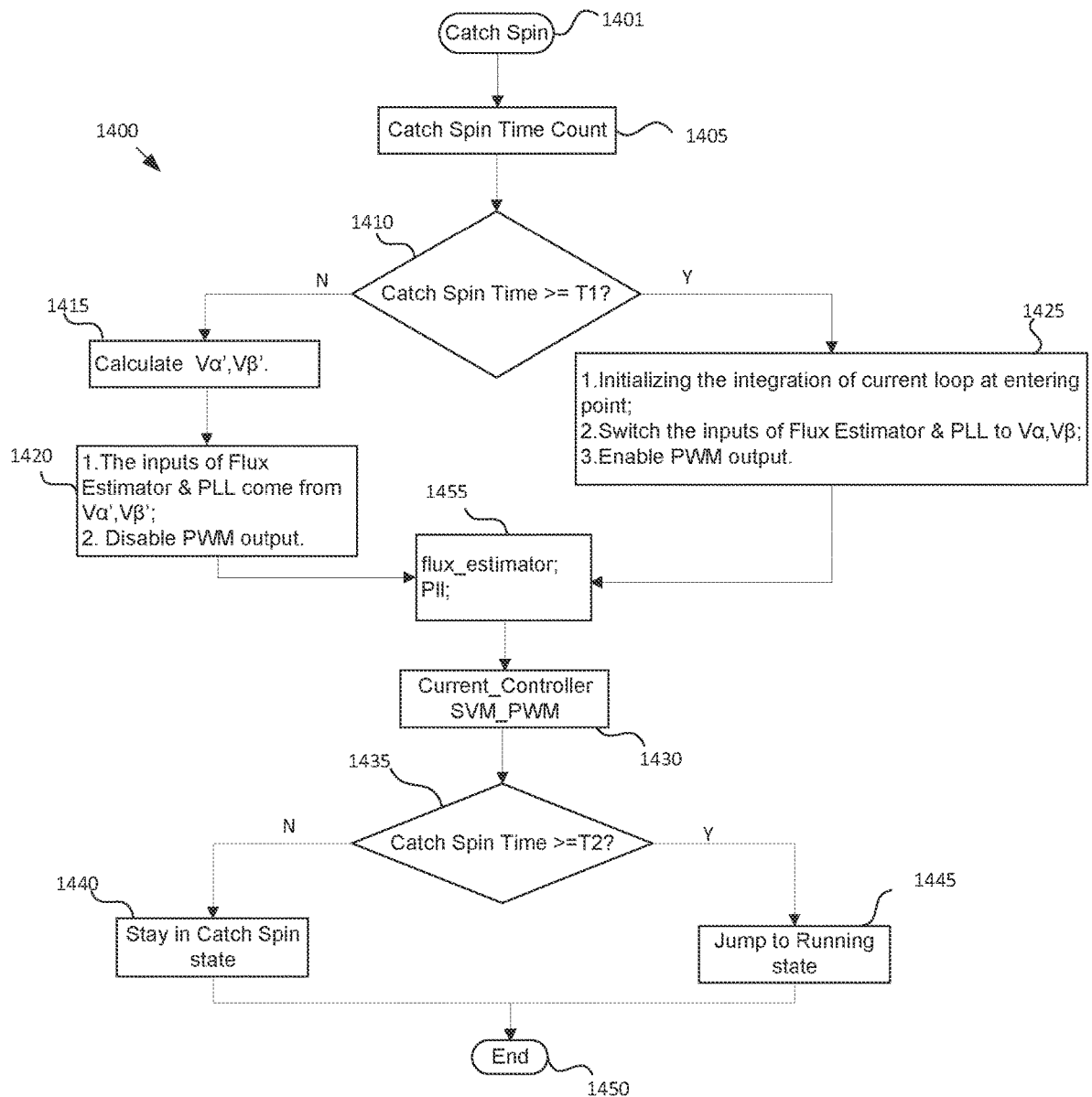
FIG. 14 is a flow diagram of another catch spin operation of the motor start operation illustrated in FIG. 12 according to one or more embodiments.

When the closed loop control (i.e., stage ③ in FIG. 10) is completed at the expiration of time interval T2 defined by the monitored catch spin time and corresponding to operations 1435 in FIG. 14, the catch spin controller 49 controls switches 46 and 47 to connect to the IPM Control block 31 in order to restore the normal running state, including re-enabling the speed control loop 12 corresponding to 1445 in FIG. 14.

The motor controller 6 obtains the CEMF or the BEMF of the motor and determines the angle, frequency, and amplitude of the CEMF or BEMF before executing the catch-spin function. In order to sense the CEMF or the BEMF, a CEMF/BEMF sampling circuit is used. The CEMF/BEMF sampling circuit includes an operational amplifier whose inputs are connected to two motor phase voltage terminals through a high resistors network. It will be appreciated that CEMF and BEMF may be used interchangeably herein.

Figure 4:
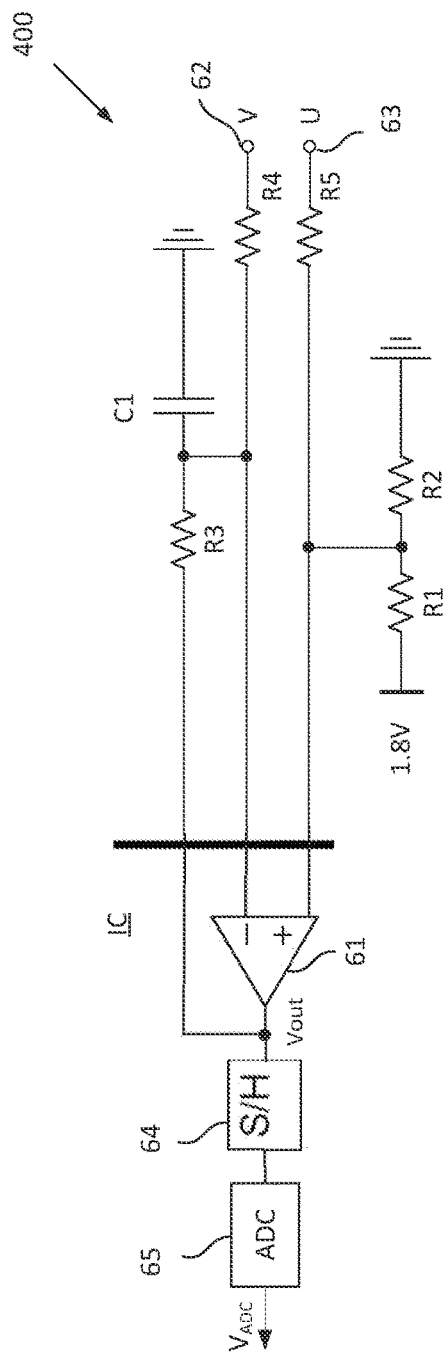
FIG. 4 is a schematic diagram of a CEMF sampling circuit based on internal operational amplifiers according to one or more embodiments.
Figure 5:
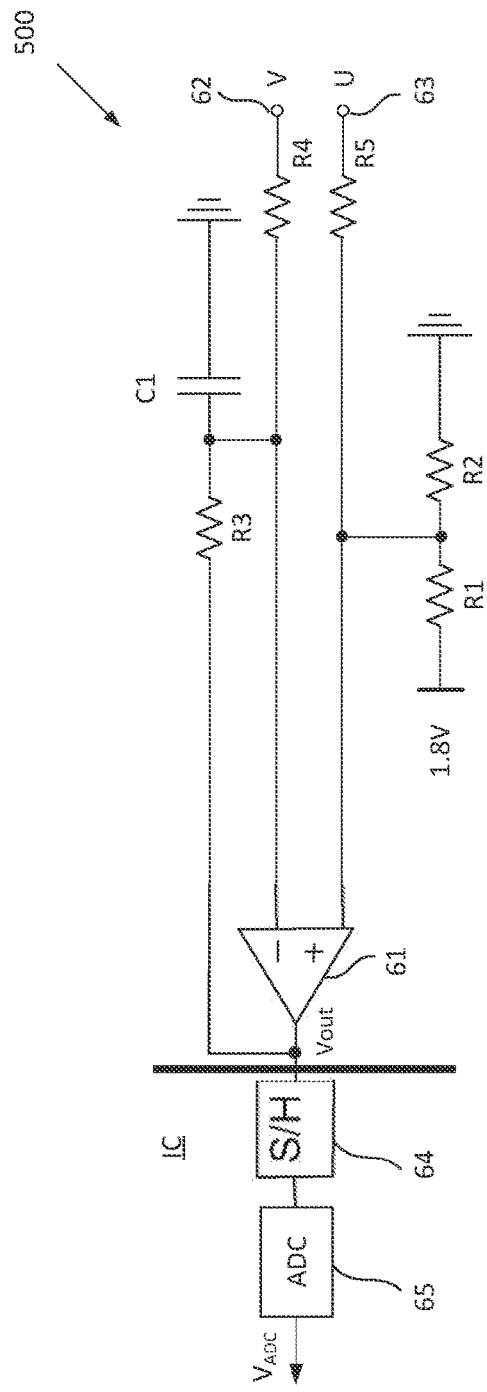
FIG. 5 is a schematic diagram of a CEMF sampling based on external operational amplifiers circuit according to one or more embodiments.

FIG. 4 is a schematic diagram of a CEMF sampling circuit 400 according to one or more embodiments. In particular, an operational amplifier 61 of the CEMF sampling circuit 400 is integrated within the motor controller IC 6. FIG. 5 is a schematic diagram of a CEMF sampling circuit 500 according to one or more embodiments. In particular, the operational amplifier 61 of the CEMF sampling circuit 500 is external to the motor controller IC 6. Otherwise, the CEMF sampling circuits 400 and 500 are the same and will be described using like reference numerals.

The CEMF sampling circuits 400 and 500 are configured to sample a line-to-line voltage of two motor phases of motor M. For example, the CEMF sampling circuits 400 and 500 sample the CEMF by a motor line-to-line voltage, so any of the line-to-line voltages UV, VW, and WV are available to be used. In this example, the UV voltage is used for the purpose of explanation. However, the VW voltage or the WV voltage may be used instead.

The CEMF sampling circuits 400 and 500 each include two inputs 62 and 63, each themselves connect to a different motor phase voltage terminal of the motor. Since the UV voltage is being measured, input 62 is coupled to the V phase voltage (i.e., VO voltage shown in FIG. 2B) of the inverter 1 or motor M and input 63 is coupled to the U phase voltage (i.e., UO voltage shown in FIG. 2B) of the inverter 1 or motor M (see FIG. 2B). The operational amplifier 61 may be an Operational Transconductance Amplifier (OTA) and is configured to perform differential sampling of the V phase voltage and U phase voltage in order to sample the line-to-line voltage of the two motor phases. In other words, the operational amplifier 61 is operated as a differential amplifier. The operational amplifier 61 provides an output signal Vout (i.e., an analog value representative of the CEMF) derived from the sampled the line-to-line voltage of the two motor phases to a sample and hold circuit 64.

The sample and hold circuit 64 samples and holds the output voltage Vout of the operational amplifier 61 and provides the output voltage Vout to an analog-to-digital converter (ADC) 65. The ADC 65 converts the output voltage of the operational amplifier 61 into a digital value $V_{ADC}$ for further signal processing, where the digital value $V_{ADC}$ is representative of the CEMF (or BEMF).

The CEMF sampling circuits 400 and 500 also include a differential sampling circuit that includes a resistor network and a capacitor C1. The resistor network connects the inputs 62 and 63 to the operational amplifier 61. The resistor network includes resistors R1, R2, R3, R4, and R5 coupled together as shown. The differential sampling circuit also includes a capacitor C1 that is used as an integral capacitor. Resistive values of the resistors may be selected such that R1=3*R3; R2=1.5*R3; R1//R2=R3; and R4=R5. Here, "R1//R2" represents the total effective resistance of (R1+R2)/(R1*R2), which is equal to R3. As a result, the gain G of the operational amplifier 61, based on the resistor network, is R3/R4 and the output voltage Vout=G*(U−V), which represents the line-to-line voltage UV adjusted with a gain G. The output of the ADC 65, $V_{ADC}$, is a digital value of Vout.

Determining the CEMF before executing the catch-spin function helps to establish the initial value of the output voltage of inverter 1, so it can make the output voltage of inverter 1 match the CEMF. By doing this, there is no difference between the output voltage of the inverter 1 and the CEMF, there is no voltage on the motor rotor windings, and so there is no overcurrent. The embodiments can achieve a motor high speed catch-spin function in the event of fast on-off switch action that traditional permanent magnet synchronous motor sensorless FOC control cannot achieve. When compared with a traditional methods of catch-spin action at the same motor speed, the catch spin current resulting from the described embodiments is much smaller that the catch spin current of traditional methods.

The CEMF sampling circuits 400 and 500 are available for the first catch spin method described in FIG. 3B and for the second catch spin method described in FIG. 3C. In particular, the output of the ADC 65, $V_{ADC}$, is provided as an input to PLL 900.

Figure 6:
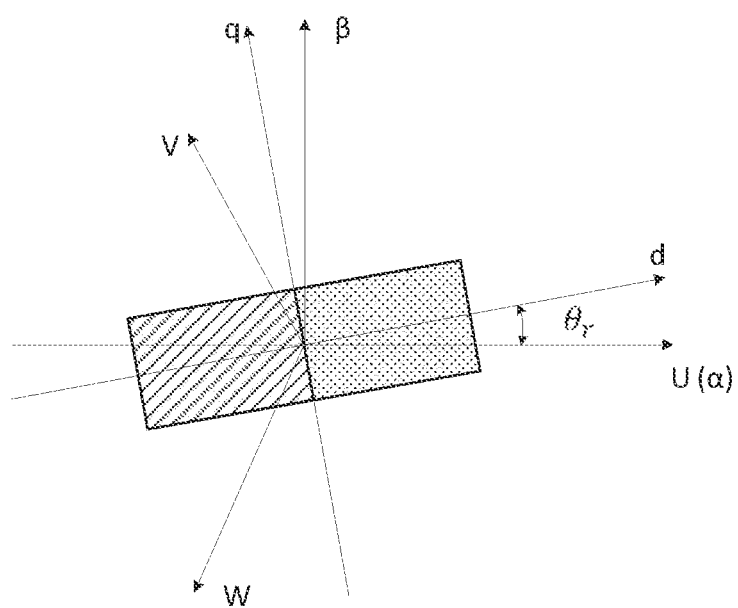
FIG. 6 illustrates a PMSM coordinate transformation.

Next, the relationship between the rotor angle of a PMSM motor and its UV voltage angle is explained. FIG. 6 illustrates a PMSM coordinate transformation. A rotor zero position in DQ coordinates aligns with the D-axis. In addition, the voltage equations are provided below in Equation 3, flux equations are provided below in Equation 4, and the voltage equations are again provided in Equation 5 using Equation 4.

$$\begin{cases} V_q = R_s I_q + p\varphi_q + \omega_r \varphi_d \\ V_d = R_s I_d + p\varphi_d - \omega_r \varphi_q \end{cases} \qquad \text{Eq. 3}$$

$$\begin{cases} \varphi_d = L_d I_q + \varphi_f \\ \varphi_q = L_q I_d \end{cases} \qquad \text{Eq. 4}$$

$$\begin{cases} V_q = R_s I_q + p(L_d I_q) + \omega_r(L_d I_q + \varphi_f) \\ V_d = R_s I_d + p(L_d I_q + \varphi_f) + \omega_r(L_d I_q) \end{cases} \qquad \text{Eq. 5}$$

$V_q$ and $V_d$ represent the stator Q and D axis voltages of the motor in a dq coordinate system, respectively. That is, $V_q$ is the motor voltage component on the Q-axis of a DQ coordinate system and $V_d$ is the motor voltage component on the D-axis of the DQ coordinate system. Similarly, $I_q$ and Id represent the stator Q and D axis currents of the motor in a DQ coordinate system, respectively. That is, $I_q$ is the motor current component on the Q-axis of the DQ coordinate system and Id is the motor current component on the D-axis of the DQ coordinate system. $\varphi_d$ and $\varphi_q$ represent the stator flux components on the D-axis and Q-axis of the DQ coordinate system, respectively. $\varphi_r$ is the rotor permanent magnet flux. $\omega_r$ is the rotor angular velocity. p is the differential factor.

When the motor runs freely and without PWM control signals (e.g., when the turn on-off switch 52 is open), Iq and Id are zero, then $V_d$=0 and $V_q=\omega_r\varphi_f$. Voltage components $V_\alpha$ and $V_\beta$ can be transformed into a two phase static coordinate with a rotor rotation angle according to Equation 6.

$$\begin{bmatrix} V_\alpha \\ V_\beta \end{bmatrix} = \begin{bmatrix} \cos\theta_r & -\sin\theta_r \\ \sin\theta_r & \cos\theta_r \end{bmatrix} \begin{bmatrix} V_d \\ V_q \end{bmatrix} = \begin{bmatrix} -\omega_r\varphi_f\sin\theta_r \\ \omega_y\varphi_f\cos\theta_r \end{bmatrix} \qquad \text{Eq. 6}$$

Equation 6 can be transformed into a three phase static coordinate with rotor rotation angle according to Equation 7.

$$\begin{bmatrix} UO \\ VO \\ WO \end{bmatrix} = \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} u_\alpha \\ u_\beta \end{bmatrix} = \begin{bmatrix} -\omega_r\varphi_f\sin\theta_r \\ \frac{\omega_r\varphi_f\sin\theta_r}{2} + \frac{\sqrt{3}(\omega_r\varphi_f\cos\theta_r)}{2} \\ \frac{\omega_r\varphi_f\sin\theta_r}{2} - \frac{\sqrt{3}(\omega_r\varphi_f\cos\theta_r)}{2} \end{bmatrix} \quad \text{Eq. 7}$$

That is to say:

$$UO = -\omega_r\varphi_f\sin\theta_r \quad \text{Eq. 8}$$

The relationship between rotor angle and U angle can be seen from above Equation 8, with the U phase voltage being UO, as shown in FIG. 2B.

Figure 7A:
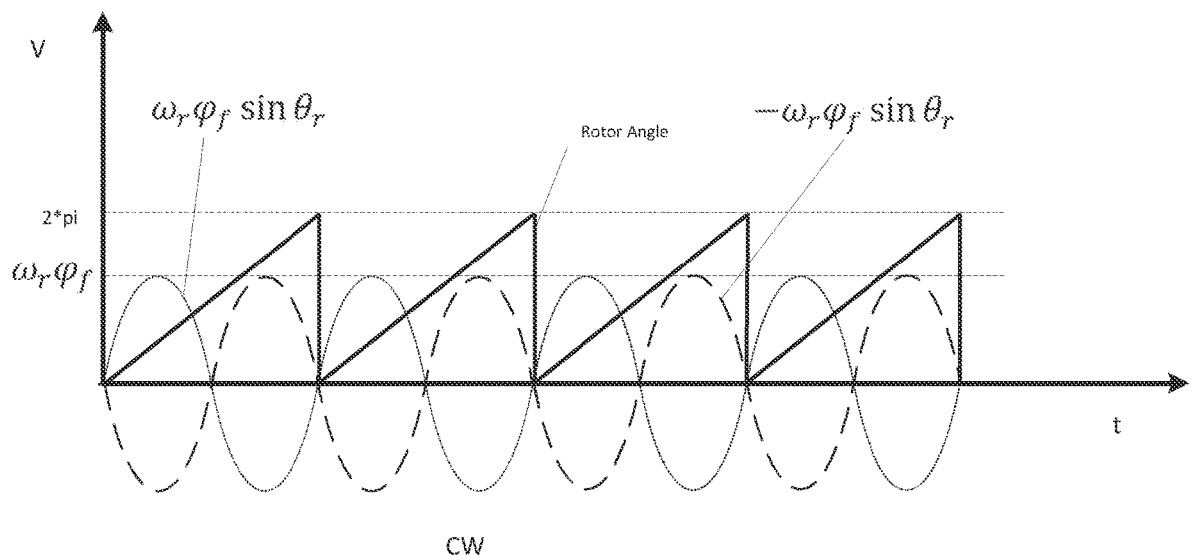
FIGS. 7A and 7B are waveform diagrams for a rotor angle and a U phase angle of the U phase voltage according to one or more embodiments.
Figure 7B:
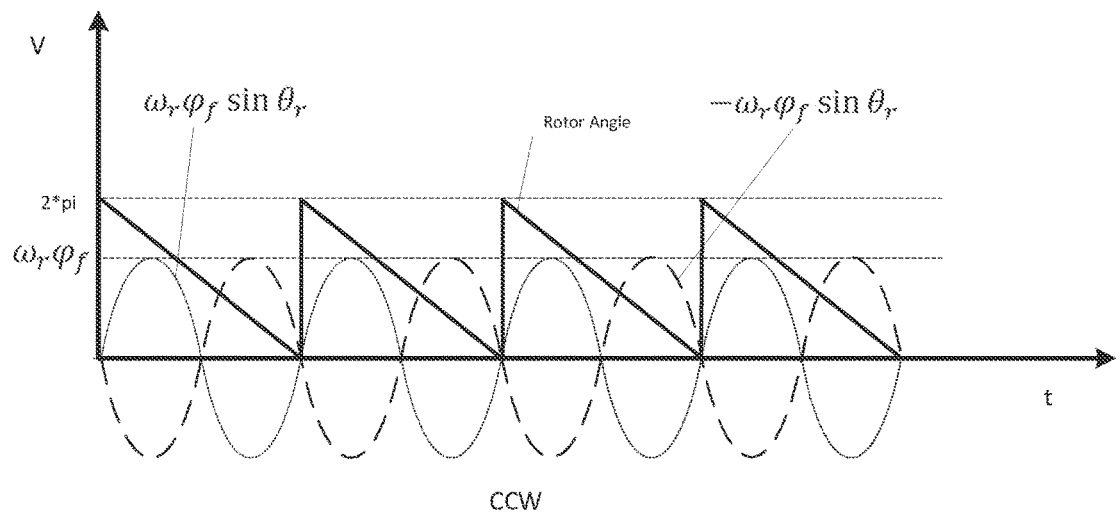

FIGS. 7A and 7B are waveform diagrams for a rotor angle and a U angle of the U phase voltage according to one or more embodiments. Accordingly, FIGS. 7A and 7B illustrate a relationship between the rotor angle and the U angle. As shown in FIGS. 7A and 7B, the rotor zero position is located at negative zero crossing point of UO regardless of whether the rotor rotates in a clockwise (CW) or counter clockwise (CCW) direction.

Figure 8A:
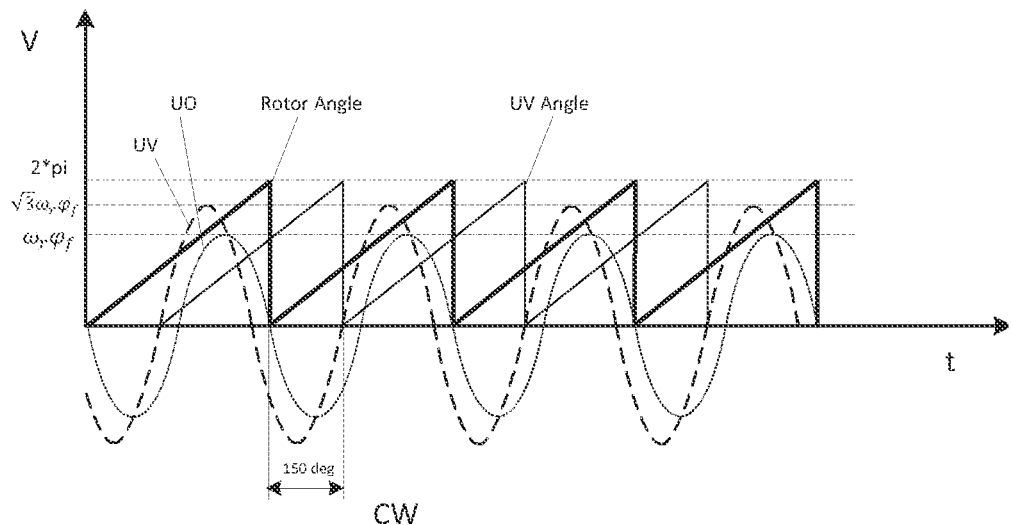
FIGS. 8A and 8B are waveform diagrams for a rotor angle and a UV voltage wave according to one or more embodiments.
Figure 8B:
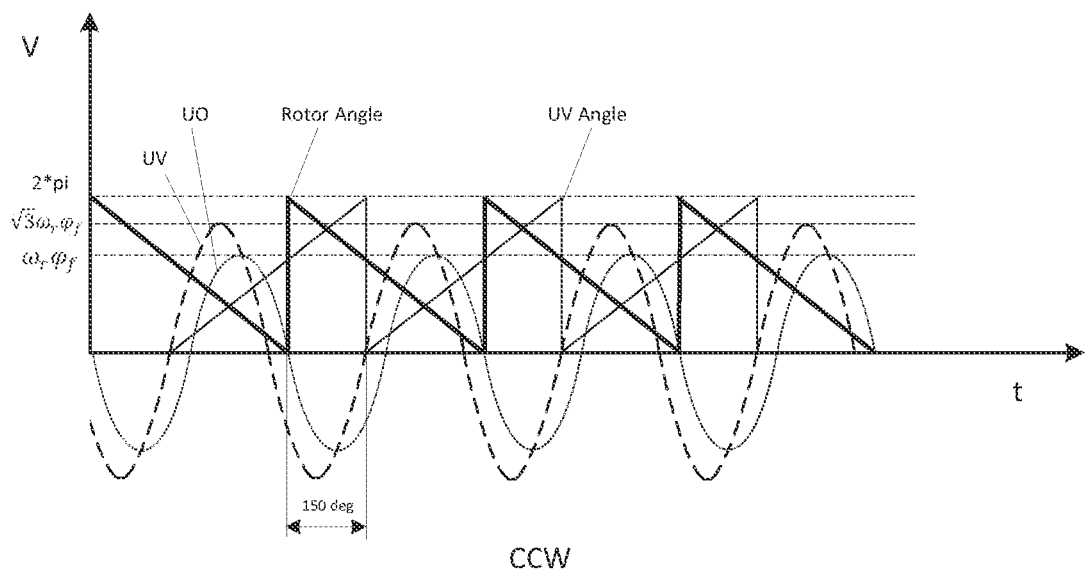

FIGS. 8A and 8B are waveform diagrams for a rotor angle and a UV voltage wave according to one or more embodiments. Since the UV voltage is 30 degrees ahead of the UO voltage, the rotor zero position is located at −150 degrees of the UV angle.

The catch spin method of the described embodiments includes determining the line-to-line voltage (e.g., the UV voltage) angle, frequency, and amplitude by a single phase-locked loop (PLL), as will be described in reference to FIG. 9. The UV angle will always increase regardless of whether the rotor rotates CW or CCW.

The rotor frequency and position angle can be observed from the UV voltage wave. The amplitude, frequency, and phase of CEMF are also be observed from the UV voltage wave.

The catch spin method of the described embodiments includes initializing the rotor angle and frequency to match the UV angle and UV frequency to ensure that the angle and frequency of the output voltage match the CEMF angle and frequency.

The catch spin method of the described embodiments includes initializing the D-axis current loop integration to 0 and the Q-axis current loop integration to the UV amplitude divided by sqrt(3) to ensure that the amplitude of output voltage matches the CEMF amplitude. The UV amplitude is divided by sqrt(3) because the internal output voltage is scaled to the UO voltage (i.e., the phase voltage to neutral point).

When the motor runs clockwise (CW):
Rotor angle=(UV angle+150 deg)
Rotor frequency=UV frequency
D axis current loop integration=0
Q axis current loop integration=UV amplitude/sqrt(3)
When motor runs counter clockwise (CCW):
Rotor angle=−(UV angle+150 deg)
Rotor frequency=−UV frequency
D axis current loop integration=0
Q axis current loop integration=−UV amplitude/sqrt(3)

The principles described in FIG. 6, FIG. 7A, FIG. 7B, FIG. 8A, and FIG. 8C are available for the first catch spin method described in FIG. 3B and for the second catch spin method described in FIG. 3C.

Figure 9:
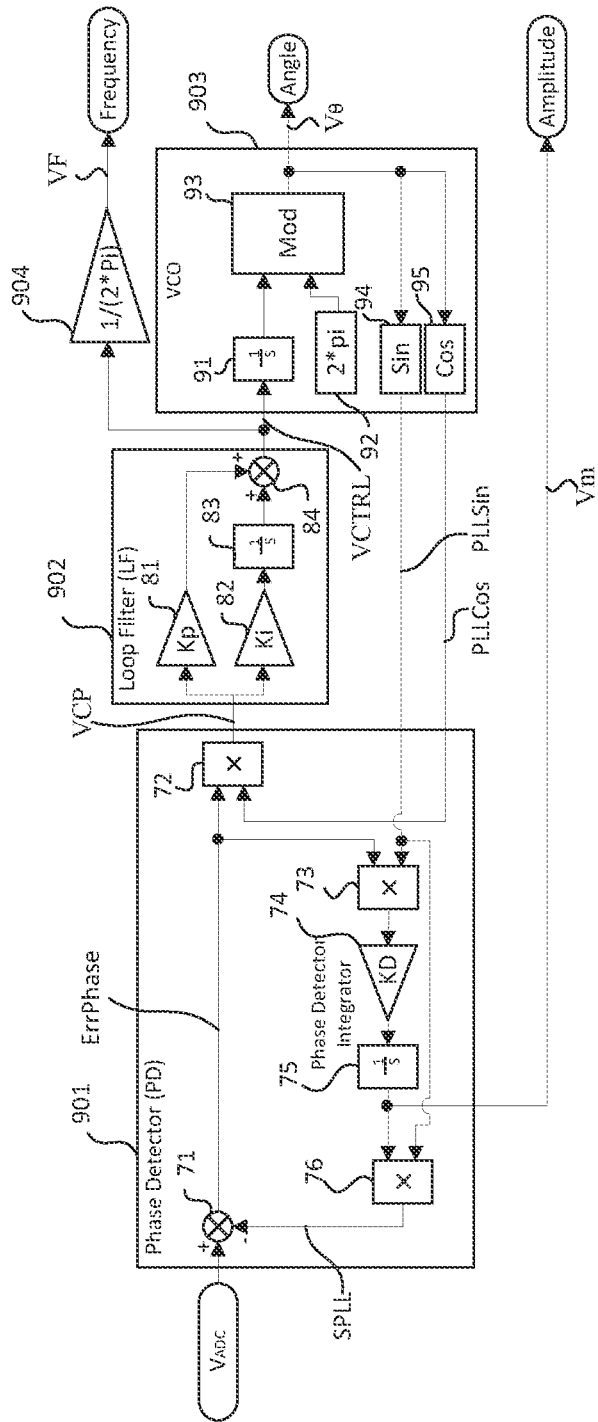
FIG. 9 is a schematic block diagram of a single phase locked loop (PLL) according to one or more embodiments.

FIG. 9 is a schematic block diagram of a PLL 900 according to one or more embodiments. The PLL 900 is a single phase system (i.e., a single phase-locked loop) and is configured to receive the line-to-line voltage (e.g., the UV voltage) representative of the CEMF from the CEMF sampling circuit 400/500 and determine the angle, frequency, and amplitude of the line-to-line voltage therefrom. In particular, the PLL 900 receives the output $V_{ADC}$ of ADC 65 of the CEMF sampling circuit 400/500 as an input voltage for determining the angle, frequency, and amplitude of the line-to-line voltage.

The PLL 900 includes a phase detector (PD) 901 configured to receive voltage $V_{ADC}$ as a reference signal of the PLL and a feedback angle signal Vo from Voltage-Controlled Oscillator (VCO) 903. The feedback angle signal Vo is converted into a sine signal PLLSin and a cosine signal PLLCos by Sin block 94 and Cos block 95, respectively. The signal SPLL is generated by a multiplier 76 and is the estimator signal of input voltage signal $V_{ADC}$. The signal SPLL is the same as signal $V_{ADC}$ when the PLL 900 is in steady state.

The error signal ErrPhase is the output of block 71 which subtracts SPLL from $V_{ADC}$. The signal ErrPhase includes the phase and amplitude difference between $V_{ADC}$ and SPLL. The output signal VCP of the phase detector (PD) 901 is an error signal that is the product of the error signal ErrPhase and the signal PLLCos output from VCO 903. The error signal Errphase is also multiplied by multiplication block 73 with sine signal PLLSin and generates an estimated amplitude Vm of input voltage $V_{ADC}$ via phase detector integration blocks 74 and 75. Block 74 provides an integration coefficient and block 75 performs the integration. The estimated amplitude Vm multiplied by sine signal PLLSin at the multiplier 76 generates the estimated signal SPLL of the input voltage $V_{ADC}$. The estimated amplitude Vm is also representative of the amplitude of the line-to-line voltage UV, thereby providing amplitude values of the line-to-line voltage UV.

The PLL 900 further includes a loop filter (LF) 902 and a voltage-controlled oscillator (VCO) 903. The output signal VCP of the PD 901 is fed to the loop filter 902. This loop filter 902 for instance may be a PI controller that determines the bandwidth of the PLL and provides the control voltage VCTRL for the VCO 903. Kp 81 is the proportional coefficient and Ki 82 is the integration coefficient of the loop filter 902, which are applied to output signal VCP. Block 83 is an integrator. Summing block 84 is configured to sum the proportional value and integral value of the loop filter 902. The output VCTRL of loop filter 902 is the angular frequency (ω) of input voltage signal $V_{ADC}$.

The VCO 903 adjusts its output (e.g., its phase) based on the control voltage VCTRL, which depends on the error signal VCP generated by the PD 901. For example, if the phase from the VCO 903 falls behind that of the phase of the reference signal $V_{ADC}$, the PD 901 changes the control voltage of the VCO 903 so that it speeds up. Likewise, if the phase creeps ahead of the phase of the reference signal $V_{ADC}$, the PD 901 changes the control voltage to slow down the VCO 903. The integral block 91 is configured to change the angular frequency (ω) to angle (θ). The Mod block 93 is configured to limit the angle θ from 0 to 2*pi by dividing 2*pi received from block 92 and calculating the remainder and an angle value θ. Then, the output of Mod block 93 is the angle $V_θ$ of input voltage $V_{ADC}$ that changes from 0 to 2*pi. As noted above, Sin block 94 and Cos block 95 generate the sine and cosine signals PLLSin and PLLCos of angle $V_θ$, respectively.

Thus, the VCO 903 generates a periodic oscillator signal $V_\theta$, and the PD 901 compares the phase of that signal, via SPLL, with the phase of the input periodic signal (i.e., reference signal $V_{ADC}$), adjusting the output $V_\theta$ of the VCO 903 to keep the phases matched. The oscillator signal $V_\theta$ is also representative of the angle of the line-to-line voltage UV, thereby providing angle values of the line-to-line voltage UV.

In steady state, the phases of the signals SPLL and $V_{ADC}$ are "locked" (or a locked, steady state is achieved) and the phase, including amplitude, of the signals SPLL is synchronized with the phase and amplitude of the reference signal $V_{ADC}$. Keeping the input and output phase in lock step also implies keeping the input and output frequencies the same.

The PLL 900 further includes element 904, which receives the control voltage VCTRL output from loop filter 902. The signal VCTRL is also the angular frequency ($\omega$) of input voltage $V_{ADC}$. Element 904 is configured to divide the VCTRL signal by 2*pi in order to generate the frequency VF of the input voltage $V_{ADC}$. Thus, element 904 converts angular frequency ($\omega$) of input voltage $V_{ADC}$ into the frequency of the input voltage $V_{ADC}$. The frequency VF is also representative of the frequency of the line-to-line voltage UV, thereby providing frequency values of the line-to-line voltage UV.

In particular, the integrator coefficient KD (block 74), proportional coefficient KP (block 81), and integrator coefficient Ki (block 82) are adjusted depending on the input voltage frequency and amplitude characteristics to meet the target dynamic performance.

The single PLL 900 is available for catch spin methods described in FIGS. 3B and 3C.

FIG. 10 is a timing diagram of a catch spin method corresponding to motor control algorithm 300*b* illustrated in FIG. 3B according to one or more embodiments. The timing diagram shows waveforms for the actual motor speed of the motor, the line-to-line voltage UV, and the U phase current Iu during a run-stop-run sequence of the motor. As can be seen, the second run operation is initiated after the stop operation is initiated but while the motor is still rotating per the actual motor speed waveform.

The catch spin sequence shown in FIG. 10 includes four stages (i.e., four stage catch spin sequence).

First, as indicated by stage ①, block 43 in FIG. 3B is initialized to the angle and frequency of the rotor, the Q axis loop integration of block 34 is initialized to the amplitude divided by sqrt(3), and the D-axis loop integration of block 35 is initialized to zero.

The determination of the line-to-line voltage (e.g., the UV voltage) angle, frequency, and amplitude by PLL 900 is always performed during any of the four stages of the catch spin process. In other words, the PLL 900 calculates the amplitude, the frequency, and the UV angle of the input motor line-line CEMF any time the controller 6 powers on.

The rotor frequency and position angle can be observed from the UV voltage wave. The amplitude, frequency, and angle of CEMF are also be observed from the UV voltage wave.

Initializing the rotor angle (PreAngle) and frequency (PreFrequency) includes setting the rotor angle and frequency to match the UV angle and UV frequency to ensure that the angle and frequency of the output voltage match the CEMF angle and frequency.

In addition, the D-axis current loop integration (CurrentIntegD) at PI controller 35 is initialized to 0 and the Q-axis current loop integration (CurrentIntegQ) at PI controller 34 is initialized to the UV amplitude divided by sqrt(3) to ensure that the amplitude of the output voltage matches the CEMF amplitude.

In addition, switches 46 and 47 in FIG. 3B are connected to two zero blocks ZB1 and ZB2, respectively, to ensure that only the current control loop is enabled (i.e., the speed control loop is disabled) during the entire catch spin period (stages ①, ②, and ③) and that IqRef and IdRef are set to zero.

Second, as indicated by stage ②, the open loop control is active and is initialized by the amplitude, angle, and frequency that are generated by the single PLL 900. The flux estimator and internal PLL block 43 in FIG. 3B is also enabled, but its outputs are not used. The IdRef and IqRef are also set to 0 in this stage.

The duration of stage ② is time interval T1 and it is configurable.

Third, as indicated by stage ③, the open loop control is switched to closed loop control by switching the angle source to the flux estimator and internal PLL 43 via switch 48 in FIG. 3B. The IdRef and IqRef are also set to 0 in this stage.

The duration of stage ③ is the time interval T2, which is also configurable.

Fourth, as indicated by stage ④, the motor controller 6 is switched to a normal running state by switching IqRef and IdRef to the IPM Control block 31 via switches 46 and 47 in FIG. 3B, ending the catch spin sequence.

FIG. 11 is a timing diagram of a catch spin method corresponding to the motor control algorithm 300*c* illustrated in FIG. 3C according to one or more embodiments. The timing diagram shows waveforms for the actual motor speed of the motor, the line-to-line voltage UV, and the U phase current Iu during a run-stop-run sequence of the motor. As can be seen, the second run operation is initiated after the stop operation is initiated but while the motor is still rotating per the actual motor speed waveform.

The catch spin sequence includes four stages (i.e., four stage catch spin sequence).

First, as indicated by stage ①, switches 46 and 47 in FIG. 3C are connected to two zero blocks ZB1 and ZB2, respectively, to ensure that only the current control loop is enabled (i.e., the speed control loop is disabled) during the entire catch spin period (stages ①, ②, and ③) and that IqRef and IdRef are set to zero.

In addition, switch 52 in FIG. 3C is open to disable the PWM output of the space vector pulse width modulator 39 in stages ① and ②.

In addition, the inputs of Flux Estimator and PLL 43 switch from Vα and Vβ to Vα' and Vβ' via switches 50 and 51 in FIG. 3C in stages ① and ②.

Second, as indicated by stage ①, the PLL 900 calculates the amplitude, the frequency, and the UV angle of the input motor line-line CEMF. The voltage component processing block 53 calculates the Vα' and Vβ' using the amplitude and frequency output from the PLL 900. This stage ensures the estimated rotor angle traces the actual motor rotor angle. IdRef and IqRef are also set to 0 in this stage.

The determination of the line-to-line voltage (e.g., the UV voltage) angle, frequency, and amplitude by PLL 900 is always performed during any of the four stages of the catch spin process. In other words, the PLL 900 calculates the amplitude, the frequency, and the UV angle of the input motor line-line CEMF any time controller 6 powers on.

The rotor frequency and position angle can be observed from UV voltage wave. The amplitude, frequency, and phase of CEMF can also be observed from the UV voltage wave.

The duration of the synchronizing period stage ② is time interval T1 and it is configurable.

Third, as indicated by stage ③, the synchronizing period is switched to closed loop control by switching the inputs of Flux Estimator and PLL 43 from Vα' and Vβ' to Vα and Vβ via switches 50 and 51 in FIG. 3C and the PWM output of the space vector pulse width modulator 39 is enabled by closing switch 52 in FIG. 3C. IdRef and IqRef are also set to 0 in this stage.

In addition, the D-axis current loop integration (CurrentIntegD) at PI controller 35 is initialized to 0 and the Q-axis current loop integration (CurrentIntegQ) at PI controller 34 is initialized to the UV amplitude divided by sqrt(3) to ensure that the amplitude of the inverter output voltage matches the CEMF amplitude when entering into stage ③ from stage ②.

The duration of closed loop control stage ③ is time interval T2 and it is configurable.

Fourth, as indicated by stage ④, the motor controller 6 is switched to a normal running state by switching IqRef and IdRef to the IPM Control block 31 via switches 46 and 47 in FIG. 3C, ending the catch spin sequence.

Figure 12:
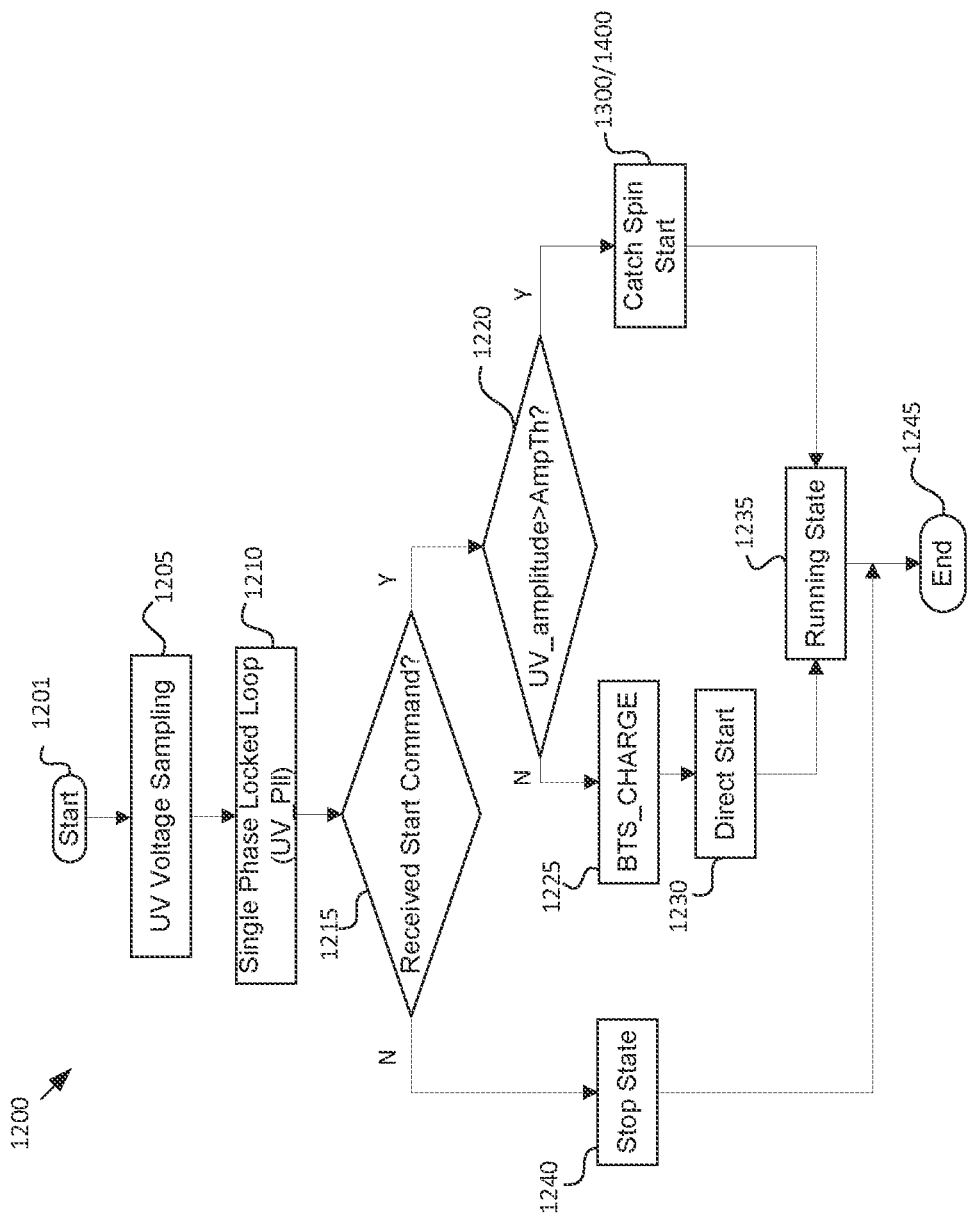
FIG. 12 is a flow diagram of a motor start operation using a catch spin method according to one or more embodiments.

FIG. 12 is a flow diagram of a motor start operation 1200 using a catch spin method according to one or more embodiments. The motor controller 6, using CEMP sampling circuit 400 or 500, performs UV voltage sampling (operation 1205). The output voltage $V_{ADC}$ is provided to the single-phase-locked loop 900, which calculates the UV amplitude, UV frequency, and UV angle (operation 1210) and proceeds to a start or stop control operation 1215.

If operation 1215 does not receive a start command, the process flow proceeds to stop state operation 1240 and the process ends at operation 1245. If operation 1215 receives a start command, then the process flow proceeds to UV amplitude comparison operation 1220.

The start command is usually transmitted to the motor controller 6 by a UART or a VSP signal.

If the start command is transmitted by UART, the motor controller 6 waits for the UART start command to start the motor after the controller 6 powers on. The motor does not start until after the motor control actuator 100 in FIG. 2A powers on and until the controller 6 receives the UART start command.

If the start command is transmitted by VSP, generally the start command is received at the same time when the motor controller 6 powers on. The VSP signal generally outputs a start signal when the motor control actuator 100 in FIG. 2A powers on and the motor controller 6 also powers on when the motor control actuator 100 powers on. Then, if the start command transmitted by VSP, the motor will start immediately after the motor control actuator 100 powers on.

In operation 1220, the UV amplitude (Vm) is compared with an amplitude threshold value AmpTh, and a comparison result (Y or N) determines a further process flow path (operation 1300/1400 or operation 1225). If the UV amplitude (Vm) is less than or equal to the amplitude threshold value AmpTh, the process flow proceeds to operation 1225, where the motor starts up directly without catch spin. BTS_CHANGE 1225 is performed to charge the Bootstrap capacitors (for U, V, and W phases) when a Bootstrap gate diver is used After charging for configured PWM periods, the process flow proceeds to 1230, where the control state changes to a normal running state directly in 1230, then proceeds to 1235.

On the other hand, if the UV amplitude (Vm) is greater than the amplitude threshold value AmpTh, the process flow proceeds to operation 1300/1400, where the motor starts up in a catch spin mode using one of the catch spin techniques described above. 1300 represents the catch method described in FIG. 3B and 1400 represents the catch spin method described in FIG. 3C. After the catch spin is completed, the motor controller 6 is switched to a normal running state by switching IqRef and IdRef to the output of IPM Control block 31 via switches 46 and 47 in FIG. 3B or FIG. 3C and the motor start operation is considered complete (operation 1245).

The motor start operation 1200 is available for both methods described in FIGS. 3B and 3C.

FIG. 13 is a flow diagram of the catch spin method 1300 of the motor start operation 1200 according to one or more embodiments, and specifically in accordance with motor control algorithm 300b. In operation 1301, the catch spin method is initiated after a positive (Y) result in operation 1220 in motor start operation 1200. In operation 1305, the catch spin controller 49 starts counting the catch-spin operation time by PWM cycles and continues to monitor the catch-spin operation time during the catch-spin process.

A catch-spin initializing flag CatchSpinByUVFlag is set to 0 by the catch spin controller 49 if the initialization of all the control loop states at stage ① has not yet been carried out, and is set to 1 if the initialization of all the control loop states at stage ① has been completed. When the catch-spin initializing flag CatchSpinByUVFlag equals 0, then the process flow proceeds to operation 1315 after operation 1310 to initialize all the control loop states for the catch-spin sequence and then proceeds to operation 1320 to operate the Flux Estimator and PLL 43 in FIG. 3B. Otherwise, the catch-spin initializing flag CatchSpinByUVFlag is set to 1, then the flow proceeds to operation 1320 directly after operation 1315.

If the catch-spin operation time is not equal to or greater than time interval T1, the flow proceeds to operation 1330 after operation 1325. Operation 1330 is the open loop stage corresponding to stage ② in FIG. 10. Here, RotorAngle is generated by the initialized PreAngleByUV and RtrFreqByUV. PreAngleByUV is initialized in operation 1315, and RtrFreqByUV is initialized by the init_pllByUV function in in operation 1315. The initialization values of PreAngleByUV and RtrFreqByUV come from UV voltage angle and frequency which are obtained from operation 1210 in FIG. 12. In particular, the values of PreAngleByUV and RtrFreqByUV are captured at the catch-spin start time (stage ①) in FIG. 10. The RtrFreqByUV is not changed at all during the catch spin process and PreAngleByUV accumulates or adds RtrFreqByUV to its initialized value in operation 1345. After 1330, the flow proceeds to operation 1340, during which the motor control algorithm 300b runs in the current control loop 13 with the flux estimator and PLL 43 being disconnected by switch 48 and the speed control loop 12 being disconnected by switched 46 and 47. The flux estimator and PLL 43 continues to run during and after operation 1320, however, it is not included in the operation 1340.

If the catch-spin operation time is equal to or greater than the time T1, the flow proceeds to operation 1335 after operation 1325. Here, the rotor angle RotorAngle input to block 38 switches to flux rotor angle Flx_Rotor_Angle, which is output from block 43 in FIG. 3B, which corresponds to stage ③ in FIG. 10. In other words, the rotor angle provided to block 38 switches from the initial pre-angle supplied by block 50 to the rotor angle supplied by block 43. After 1335, the flow proceeds to operation 1340, during which the motor control algorithm 300b runs in the current control loop 13 with the flux estimator and PLL 43 being connected by switch 48 and the speed control loop 12 being disconnected by switched 46 and 47. The block 43 runs during and after operation 1320, but it is not used for performing operation 1340.

The operation 1345 is intended to accumulate PreAngleByUV by RtrFreqByUV for the open loop process (i.e., stage ② in FIG. 10), but it operates throughout the entire catch-spin process. In operation 1350, the spin catch controller 49 determines whether the catch spin process is completed. If the catch-spin operation time is equal to or greater than time T2, then the catch spin process is completed and the flow proceeds to operation 1360, where the motor control algorithm jumps to the normal running state. Otherwise, the flow proceeds to operation 1355 and remains in the catch spin process.

When the catch spin mode is initialized in operation 1315, the init_Speed_Controller function, the init_pllBy UV function, the Flux_estimatorByUV function, the init_CurrIntegByUV and PreAngleByUV are initialized. The initializing process corresponds to stage ① of the four catch spin sequence described in FIG. 10. The init_Speed_Controller initializes the values of blocks 21 and 23 of speed controller 12 in FIG. 3B. The init_pllBy UV and Flux_estimatorByUV initializes the value of block 43 in FIG. 3B. The init_CurrIntegByUV initializes blocks 34 and 35 of current controller 13 in FIG. 3B. PreAngleByUV obtains the UV voltage angle at the stage ① in FIG. 10 and performs open loop control based on this value during stage ② in FIG. 10.

Initializing init_Speed_Controller includes clearing the integration of block 23 in FIG. 3B, setting TrqRef to 0. This ensures that the input torque current of current controller 13 is zero in the catch spin process.

Initializing the init_pllBy UV includes setting the rotor angle and rotor frequency in the internal PLL of block 43 to the angle and frequency of the sampled CEMF via $V_{ADC}$. In particular, the RtrFreqByUV is initialized by CEMF frequency in this function.

Initializing the init_flux_estimatorByUV includes initializing Flx_Alpha and Flx_Beta integration in block 43 by the angle and the amplitude of the sampled CEMF via $V_{ADC}$.

The init_pllByUV and init_flux_estimatorByUV are all included in block 43 in FIG. 3B.

Initializing init_CurrIntegByUV includes setting the amplitude of output voltage Vm of the PLL 900 according to the amplitude of CEMF. In particular, the Q-axis current loop integration (CurrentIntegQ, block 34) is initialized to the UV amplitude Vm divided by sqrt(3) to ensure that the amplitude of output voltage matches the CEMF amplitude. The D-axis current loop integration (CurrentIntegD, block 35) is initialized to 0.

The motor controller 6 uses the CEMF angle and CEMF frequency upon entering catch spin mode to construct a rotor angle to be input into block 38 instead of using the internal PLL output of block 43 when a catch spin time is shorter than a predetermined time interval T1 (see operations 1325 and 1330). Here, the predetermined time interval is configurable.

When the catch spin time is greater than or equal to the predetermined time interval T1, then the motor controller 6 switches the rotor angle to the internal PLL output of block 43 to be input into block 38.

Thus, this technique ensures that there is sufficient time for the internal PLL and flux estimator of block 43 to be stable. The motor controller 6 switches to a normal running state after time T2 (see control loop comprised of operations 1350, 1355, and 1360). The catch spin operation is considered complete at operation 1365.

In view of the above, the described embodiments provide access to the angle, frequency, and amplitude of CEMF for a high motor speed catch spin technique and helps to avoid overcurrent. In a preliminary stage of catch spin, the rotor angle is constructed from the CEMF angle and the CEMF frequency. Thereafter, the source of the rotor angle is switched from 1330 (calculated by CMEF angle PreAngleByUV and CMEF frequency RtrFreqByUV in 1345) to 1335 (the output of the flux estimator and PLL 43 when they are stable).

In addition, operation 1335 disconnects switches 46 and 47 from block 31 in FIG. 3B and connects the switches 46 and 47 to two zero blocks ZB1 and ZB2.

In addition, operation 1360 connects switches 46 and 47 to block 31 in FIG. 3B to restore the normal running state.

FIG. 14 is a flow diagram of the catch spin method 1400 of the motor start operation 1200 according to one or more embodiments, and specifically in accordance with motor control algorithm 300c. In operation 1405, the catch spin controller 49 starts counting the catch-spin operation time by PWM cycles and continues to monitor the catch-spin operation time during the catch-spin process. If the catch-spin operation time counted by the catch spin controller 49 in operation 1405 is not greater than time T1, the flow proceeds to operation 1415 after operation 1410.

In operation 1415, Vα' and Vβ' are calculated. Then, Vα' and Vβ' are fed to block 43 in operation 1420 to estimate the rotor angle. The PWM output of block 39 is disabled in operation 1420. After 1420, the flow proceeds to operation 1455 which corresponds to the operation of the flux estimator and PLL 43 for rotor angle and frequency estimation, and then the flow proceeds to the operation 1430 which is performed by the current controller 13 in FIG. 3C. The flux estimator and PLL 43 continues to run during and after operation 1455, but it is not used for performing operation 1430. This process corresponds to stages ① and ② in FIG. 11.

If the catch-spin operation time is equal or greater than time T1, the flow proceeds to operation 1425 after operation 1410. The integration of current loop block 34 and block 35 are initialized in the operation 1425. The inputs of the flux estimator and PLL 43 in FIG. 3C are switched from Vα' and Vβ' to Vα and Vβ, and PWM output of block 39 is enabled in operation 1425. After 1425, the flow proceeds to operation 1455 which is corresponding to the flux estimator and PLL 43 for rotor angle and frequency estimation, then the flow proceeds to the operation 1430 which is performed by the current controller 13 in FIG. 3C. This process corresponds to the stage ③ in FIG. 11.

In operation 1435, the spin catch controller 49 determines whether the catch spin process is completed. If the catch-spin is equal to or greater than time T2, then the catch spin process is completed and the flow proceeds to operation 1445 and jumps to a normal running state. Otherwise, the flow proceeds to operation 1440 and remains in the catch spin process.

In addition, in operation 1440, switches 46 and 47 are disconnected from block 31 in FIG. 3C and are connected to two zero blocks ZB1 and ZB2.

In addition, in operation 1445, switches 46 and 47 are connected to block 31 in FIG. 3C to restore the normal running state.

Additional embodiments are provided below.

1. A motor control actuator configured to drive a permanent magnet synchronous motor (PMSM) with sensorless Field Oriented Control (FOC), the motor control actuator comprising: a sampling circuit configured to measure a counter electro motive force (CEMF) or a back electro motive force (BEMF) of the PMSM, while the PMSM rotates, and generate a measurement signal based on the measured CEMF or the measured BEMF; a phase-locked loop (PLL) configured to receive the measurement signal and extract an amplitude and an angle of the measured CEMF or the measured BEMF from the measurement signal; and a motor controller comprising a current controller configured to generate a first set of two phase alternating current (AC) voltage components based on an estimated rotor angle, generate a second set of two phase AC voltage components based on the amplitude and the angle, generate control signals for driving the PMSM based on the first set of two phase AC voltage components, wherein the current controller is configured to perform a catch spin sequence for restarting the PMSM while rotating, the catch spin sequence including a synchronizing period followed by a closed loop control period, wherein, during the synchronizing period, the motor controller is configured to estimate a first rotor angle based on the second set of two phase AC voltage components, wherein the first rotor angle is used by the current controller to synchronize to a rotor angle of the PMSM, and wherein, during the closed loop control period, the motor controller is configured to estimate a second rotor angle based on the first rotor angle and based on the first set of two phase AC voltage components, wherein the second rotor angle is used by the current controller to synchronize to the rotor angle of the PMSM.

2. The motor control actuator of embodiment 1, further comprising: a multi-phase inverter configured to supply multiple phase voltages to the PMSM based on the control signals, wherein the multi-phase inverter comprises a plurality of inverter legs, each including an output that supplies one of the multiple phase voltages, wherein the sampling circuit is coupled to a first output of the multi-phase inverter to receive a first phase voltage and is coupled to a second output of the multi-phase inverter to receive a second phase voltage, and the sampling circuit is configured to measure a line-to-line voltage based on the first phase voltage and the second phase voltage, wherein the measured CEMF or the measured BEMF corresponds to the measured line-to-line voltage.

3. The motor control actuator of embodiment 2, wherein the sampling circuit is configured to adjust the measured line-to-line voltage by a predetermined gain to generate an adjusted line-to-line voltage and digitally convert the adjusted line-to-line voltage into the measurement signal.

4. The motor control actuator of embodiment 3, wherein the amplitude and the angle of the measured CEMF or the measured BEMF is an amplitude and an angle of the measured line-to-line voltage, respectively.

5. The motor control actuator of embodiment 1, wherein the motor controller further comprises: a speed constant controller comprising a speed control output coupled to a current control input of the current controller, wherein the speed constant controller is configured to regulate a motor speed of the PMSM based on a target speed, wherein, during an entirety of the catch spin sequence, the motor controller is configured to disable the speed constant controller.

6. The motor control actuator of embodiment 5, wherein, upon completion of the catch spin sequence following the closed loop control period, the motor controller is configured to enable the speed constant controller.

7. The motor control actuator of embodiment 5, wherein the current controller comprises an interior permanent magnet (IPM) controller configured to receive a torque current from the speed control output and separate the torque current into a first target current for a Q-axis current component and a second target current for a D-axis current component, wherein the motor controller is configured to set the first target current and the second target current to zero during an entirety of the catch spin sequence.

8. The motor control actuator of embodiment 7, wherein, upon completion of the catch spin sequence following the closed loop control period, the motor controller is configured to enable the IPM controller to generate the first target current and the second target current based on the torque current.

9. The motor control actuator of embodiment 1, wherein the current controller includes a Q-axis current component Proportional-Integral compensator that is initialized by the amplitude upon entering into the closed loop control period of the catch spin sequence and a D-axis current component Proportional-Integral compensator that is initialized by zero upon entering into the closed loop control period of the catch spin sequence.

10. The motor control actuator of embodiment 1, wherein the PLL comprises a phase detector, a controlled oscillator, and a loop filter coupled between the phase detector and the controlled oscillator, wherein the phase detector is configured to receive the measurement signal as a reference signal for the PLL, and generate an error signal based on the measurement signal, wherein the loop filter is configured to receive the error signal and generate a control voltage for the controlled oscillator, wherein the controlled oscillator is configured to generate the angle based on the control voltage, and wherein the phase detector is configured to receive the angle from the controlled oscillator as a feedback angle signal, and generate the amplitude based on the feedback angle signal.

11. The motor control actuator of embodiment 10, wherein the phase detector is configured to generate the error signal based on the measurement signal and the feedback angle signal.

12. The motor control actuator of embodiment 1, wherein the current controller comprises an interior permanent magnet (IPM) controller configured to generate a first target current for a Q-axis current component and a second target current for a D-axis current component, and the motor controller is configured to set the first target current and the second target current to zero during an entirety of the catch spin sequence.

13. The motor control actuator of embodiment 1, wherein: during the synchronizing period, the motor controller is configured disable the control signals, and during the closed loop control period, the motor controller is configured to enable the control signals.

14. The motor control actuator of embodiment 1, wherein the motor controller is configured to perform the synchronizing period for a first predetermined time interval and perform the closed loop control period for a second predetermined time interval.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Depending on certain implementation requirements, embodiments provided herein can be implemented in hardware or in software. The implementation can be performed using a digital storage medium, for example a floppy disk, a DVD, a Blue-Ray, a CD, a RAM, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A control unit including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes a computer program to perform the steps of a method. Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A motor control actuator configured to drive a permanent magnet synchronous motor (PMSM) with sensorless Field Oriented Control (FOC), the motor control actuator comprising:

a sampling circuit configured to measure a back electro motive force (BEMF) of the PMSM, while the PMSM rotates, and generate a measurement signal based on the measured BEMF;

a phase-locked loop (PLL) configured to receive the measurement signal and extract an amplitude and an angle of the BEMF from the measurement signal; and a motor controller configured to generate a first set of two phase alternating current (AC) voltage components based on an estimated rotor angle, generate a second set of two phase AC voltage components based on the amplitude and the angle, and generate control signals for driving the PMSM based on the first set of two phase AC voltage components, wherein the motor controller is configured to perform a catch spin sequence for restarting the PMSM while rotating, the catch spin sequence including a synchronizing period followed by a closed loop control period, wherein, during the synchronizing period, the motor controller is configured to estimate a first rotor angle based on the second set of two phase AC voltage components, wherein the first rotor angle is used by the motor controller to synchronize to a rotor angle of the PMSM, and wherein, during the closed loop control period, the motor controller is configured to estimate a second rotor angle based on the first rotor angle and based on the first set of two phase AC voltage components, wherein the second rotor angle is used by the motor controller to synchronize to the rotor angle of the PMSM.

2. The motor control actuator of claim 1, further comprising:

a multi-phase inverter configured to supply multiple phase voltages to the PMSM based on the control signals, wherein the multi-phase inverter comprises a plurality of inverter legs, each including an output that supplies one of the multiple phase voltages, wherein the sampling circuit is coupled to a first output of the multi-phase inverter to receive a first phase voltage and is coupled to a second output of the multi-phase inverter to receive a second phase voltage, and the sampling circuit is configured to measure a line-to-line voltage based on the first phase voltage and the second phase voltage, wherein the measured BEMF corresponds to the measured line-to-line voltage.

3. The motor control actuator of claim 2, wherein the sampling circuit is configured to adjust the measured line-to-line voltage by a predetermined gain to generate an adjusted line-to-line voltage and digitally convert the adjusted line-to-line voltage into the measurement signal.

4. The motor control actuator of claim 3, wherein the amplitude and the angle of the measured BEMF is an amplitude and an angle of the measured line-to-line voltage, respectively.

5. The motor control actuator of claim 1, wherein the motor controller comprises:
a speed constant controller comprising a speed control output coupled to a current control input of the motor controller, wherein the speed constant controller is configured to regulate a motor speed of the PMSM based on a target speed,
wherein, during an entirety of the catch spin sequence, the motor controller is configured to disable the speed constant controller.

6. The motor control actuator of claim 5, wherein, upon completion of the catch spin sequence following the closed loop control period, the motor controller is configured to enable the speed constant controller.

7. The motor control actuator of claim 5, wherein the motor controller comprises an interior permanent magnet (IPM) controller configured to receive a torque current from the speed control output and separate the torque current into a first target current for a Q-axis current component and a second target current for a D-axis current component,
wherein the motor controller is configured to set the first target current and the second target current to zero during an entirety of the catch spin sequence.

8. The motor control actuator of claim 7, wherein, upon completion of the catch spin sequence following the closed loop control period, the motor controller is configured to enable the IPM controller to generate the first target current and the second target current based on the torque current.

9. The motor control actuator of claim 1, wherein the motor controller includes a Q-axis current component Proportional-Integral compensator that is initialized by the amplitude upon entering into the closed loop control period of the catch spin sequence and a D-axis current component Proportional-Integral compensator that is initialized by zero upon entering into the closed loop control period of the catch spin sequence.

10. The motor control actuator of claim 1, wherein the PLL includes a PLL comprising a phase detector, a controlled oscillator, and a loop filter coupled between the phase detector and the controlled oscillator,
wherein the phase detector is configured to receive the measurement signal as a reference signal for the PLL, and generate an error signal based on the measurement signal,
wherein the loop filter is configured to receive the error signal and generate a control voltage for the controlled oscillator, wherein the controlled oscillator is configured to generate the angle based on the control voltage, and
wherein the phase detector is configured to receive the angle from the controlled oscillator as a feedback angle signal, and generate the amplitude based on the feedback angle signal.

11. The motor control actuator of claim 10, wherein the phase detector is configured to generate the error signal based on the measurement signal and the feedback angle signal.

12. The motor control actuator of claim 1, wherein the motor controller comprises an interior permanent magnet (IPM) controller configured to generate a first target current for a Q-axis current component and a second target current for a D-axis current component, and
the motor controller is configured to set the first target current and the second target current to zero during an entirety of the catch spin sequence.

13. The motor control actuator of claim 1, wherein:
during the synchronizing period, the motor controller is configured disable the control signals, and
during the closed loop control period, the motor controller is configured to enable the control signals.

14. The motor control actuator of claim 1, wherein the motor controller is configured to perform the synchronizing period for a first predetermined time interval and perform the closed loop control period for a second predetermined time interval.

15. The motor control actuator of claim 1, wherein the motor controller comprises:
a current controller configured to generate the first set of two phase alternating current (AC) voltage components based on the estimated rotor angle, generate the second set of two phase AC voltage components based on the amplitude and the angle, and generate the control signals for driving the PMSM based on the first set of two phase AC voltage components,
wherein the current controller is configured to perform the catch spin sequence for restarting the PMSM while rotating, wherein during the synchronizing period the first rotor angle is used by the current controller to synchronize to the rotor angle of the PMSM, and wherein during the closed loop control period the second rotor angle is used by the current controller to synchronize to the rotor angle of the PMSM; and
a speed constant controller comprising a speed control output coupled to a current control input of the current controller, wherein the speed constant controller is configured to regulate a motor speed of the PMSM based on a target speed,
wherein, during an entirety of the catch spin sequence, the motor controller is configured to disable the speed constant controller.

16. The motor control actuator of claim 15, wherein, upon completion of the catch spin sequence following the closed loop control period, the motor controller is configured to enable the speed constant controller.

17. The motor control actuator of claim 15, wherein the current controller comprises an interior permanent magnet (IPM) controller configured to receive a torque current from the speed control output and separate the torque current into a first target current for a Q-axis current component and a second target current for a D-axis current component,
wherein the motor controller is configured to set the first target current and the second target current to zero during an entirety of the catch spin sequence.

18. The motor control actuator of claim 17, wherein, upon completion of the catch spin sequence following the closed loop control period, the motor controller is configured to enable the IPM controller to generate the first target current and the second target current based on the torque current.

\* \* \* \* \*